United States Patent
Kaufhold et al.

(10) Patent No.: US 10,504,004 B2
(45) Date of Patent: Dec. 10, 2019

(54) SYSTEMS AND METHODS FOR DEEP MODEL TRANSLATION GENERATION

(71) Applicant: GENERAL DYNAMICS MISSION SYSTEMS, INC., Fairfax, VA (US)

(72) Inventors: John Patrick Kaufhold, Arlington, VA (US); Jennifer Alexander Sleeman, Glenwood, MD (US)

(73) Assignee: GENERAL DYNAMICS MISSION SYSTEMS, INC., Fairfax, VA (US)

( * ) Notice: Subject to any disclaimer, the term of this patent is extended or adjusted under 35 U.S.C. 154(b) by 0 days.

(21) Appl. No.: 15/705,504

(22) Filed: Sep. 15, 2017

(65) Prior Publication Data

US 2019/0080205 A1    Mar. 14, 2019

Related U.S. Application Data

(60) Provisional application No. 62/395,841, filed on Sep. 16, 2016.

(51) Int. Cl.
*G06K 9/62* (2006.01)
*G06N 3/08* (2006.01)
*G06N 3/04* (2006.01)

(52) U.S. Cl.
CPC ......... *G06K 9/6257* (2013.01); *G06K 9/6232* (2013.01); *G06K 9/6256* (2013.01);
(Continued)

(58) Field of Classification Search
CPC .............. G06T 5/00; G06T 2207/10024; G06T 7/0012; G06T 2207/10016;
(Continued)

(56) References Cited

U.S. PATENT DOCUMENTS 9,754,188 B2 *  9/2017  Mei ...................... G06K 9/6256
10,043,261 B2 *  8/2018  Bhaskar ................ G06T 7/0006
(Continued)

OTHER PUBLICATIONS

Vincent et al., "Stacked denoising autoencoders: Learning useful representations in a deep network with a local denoising criterion." Journal of machine learning research 11, No. Dec (2010): 3371-3408. (Year: 2010).*

(Continued)

*Primary Examiner* — Feng Niu
(74) *Attorney, Agent, or Firm* — LKGlobal | Lorenz & Kopf, LLP

(57) ABSTRACT

Embodiments of the present invention relate to systems and methods for improving the training of machine learning systems to recognize certain objects within a given image by supplementing an existing sparse set of real-world training images with a comparatively dense set of realistic training images. Embodiments may create such a dense set of realistic training images by training a machine learning translator with a convolutional autoencoder to translate a dense set of synthetic images of an object into more realistic training images. Embodiments may also create a dense set of realistic training images by training a generative adversarial network ("GAN") to create realistic training images from a combination of the existing sparse set of real-world training images and either Gaussian noise, translated images, or synthetic images. The created dense set of realistic training images may then be used to more effectively train a machine learning object recognizer to recognize a target object in a newly presented digital image.

9 Claims, 26 Drawing Sheets

Using Translated and Generated Images to Supplement Training Data to Improve the Learning Process of the Object Recognizer.

(52) U.S. Cl.
CPC ......... *G06N 3/0454* (2013.01); *G06N 3/0472* (2013.01); *G06N 3/0481* (2013.01); *G06N 3/08* (2013.01); *G06N 3/088* (2013.01)

(58) Field of Classification Search
CPC ... G06T 2207/10048; G06T 7/11; G06T 7/20; G06T 5/20; G06T 7/60; G06T 5/001; G06T 7/00; G06T 2207/20112; G06T 2207/20221; G06T 7/70
See application file for complete search history.

(56) References Cited

U.S. PATENT DOCUMENTS

| | | | | |
|---|---|---|---|---|
| 10,176,363 | B2* | 1/2019 | El-Zehiry | G01N 15/1463 |
| 10,346,740 | B2* | 7/2019 | Zhang | G06N 3/0454 |
| 2016/0117574 | A1* | 4/2016 | Mei | G06K 9/6256 382/159 |
| 2017/0193400 | A1* | 7/2017 | Bhaskar | G06F 17/5009 |
| 2017/0200265 | A1* | 7/2017 | Bhaskar | G06T 7/0006 |
| 2017/0278135 | A1* | 9/2017 | Majumdar | G06Q 30/0256 |
| 2017/0337682 | A1* | 11/2017 | Liao | G06T 7/30 |
| 2017/0344907 | A1* | 11/2017 | Arai | G06N 99/00 |
| 2018/0122048 | A1* | 5/2018 | Wang | G06T 3/4053 |
| 2018/0284735 | A1* | 10/2018 | Cella | G05B 23/024 |

OTHER PUBLICATIONS

Fu et al., "Relaxing from vocabulary: Robust weakly-supervised deep learning for vocabulary-free image tagging." In Proceedings of the IEEE international conference on computer vision, pp. 1985-1993. 2015. (Year: 2015).*

Holden et al., "Learning Motion Manifolds with Convolutional Autoencoders". in Proceeding SA '15 SIGGRAPH Asia 2015 Technical Briefs., 18, ACM, New York, NY, USA. DOI: 10.1145/2820903.2820918 (Year: 2015).*

Gauthier, "Conditional generative adversarial nets for convolutional face generation." Class Project for Stanford CS231N: Convolutional Neural Networks for Visual Recognition, Winter semester 2014, No. 5 (2014): 2. (Year: 2014).*

Makhzani et al., "Adversarial autoencoders." arXiv:1511.05644, May 25, 2016. (Year: 2016).*

Jarrett et al., "What is the best multi-stage architecture for object recognition?" In Proc. International Conference on Computer Vision (ICCV'09), pp. 2146-2153. IEEE. 2009 (Year: 2009).*

Goodfellow et al., "Generative adversarial nets." In Advances in neural information processing systems, pp. 2672-2680. 2014. (Year: 2014).*

Postavaru et al., "Censoring Sensitive Data from Images." In 2016 18th International Symposium on Symbolic and Numeric Algorithms for Scientific Computing (SYNASC), pp. 443-448. IEEE, Sep. 1, 2016. (Year: 2016).*

Marblestone et al., "Toward an integration of deep learning and neuroscience." Frontiers in computational neuroscience 10 (2016): 94. (Year: 2016).*

Luo et al., "Multistage committees of deep feedforward convolutional sparse denoise autoencoder for object recognition." In 2015 Chinese Automation Congress (CAC), pp. 565-570. IEEE, 2015. (Year: 2015).*

Goodfellow, Ian, et al. "Generative Adversarial Nets." Advances in neural information processing systems (2014).

Koehn, Philipp. "Statistical Machine Translation Tutorial," Presentation at University of Edinburgh, (2007).

Hinton and Salakhutdinov, "Reducing the dimensionality of data with neural networks." Science 313.5786 at 504-507 (2006).

Hinton, Osindero, and Teh, "A fast learning algorithm for deep belief nets." Neural Computation 18.7 at 1527-1554 (2006).

Radford, Metz, and Chintala, "Unsupervised representation learning with deep convolutional generative adversarial networks." arXiv preprint arXiv:1511.06434 (2015).

Pu, Yunchen, et al. "Variational autoencoder for deep learning of images, labels and captions." Advances in Neural Information Processing Systems (2016).

Koehn, Philipp. "Statistical machine translation." Cambridge University Press, (2009) (Chapter 4, Word Based Models).

Koehn, Philipp. "Statistical machine translation." Cambridge University Press, (2009) (Chapter 5, Phrase Based Models).

Koehn, Philipp. "Statistical machine translation." Cambridge University Press, (2009) (Chapter 6, Decoding).

Koehn, Philipp. "Statistical machine translation." Cambridge University Press, (2009) (Chapter 7, Language Models).

Koehn, Philipp. "Statistical machine translation." Cambridge University Press, (2009) (Chapter 8, Evaluation).

Koehn, Philipp. "Statistical machine translation." Cambridge University Press, (2009) (Chapter 11, Tree Based Models).

\* cited by examiner

Figure 1 - Well-Balanced, Sufficiently Sized Training Set.

Figure 2 - Sparse, Unbalanced Training Set.

Figure 3 - Non-Existent Classes Sparse, Unbalanced Training Set.

Figure 4 - Translated Image Enriched Training Set.

Figure 5 - Generated Image Enriched Training Set.

Figure 6 – Training the Translator.

Figure 7 – Training the Generator initialization with Gaussian Noise.

Figure 8 – Training the Generator initialization with translated images.

Figure 9 – Training the Generator initialization with synthetic images.

Figure 10 – Training the Translator using the activations from the object recognizer as input to the loss function of the autoencoder.

Figure 11 – Recognizing Objects in Images using a Object Recognizer.

Figure 12 – Using Translated Images to Supplement Training Data to Improve the Learning Process of the Object Recognizer.

Figure 13 – Using Generated Images to Supplement Training Data to Improve the Learning Process of the Object Recognizer.

Figure 14 – Using Translated and Generated Images to Supplement Training Data to Improve the Learning Process of the Object Recognizer.

Figure 15 - Translating synthetic images into photo realistic images.

Figure 16 - Translating images of one type to another.

Figure 17 – Linear Separable Classification.

Figure 18 – Non-Linear Separable Problem.

Figure 19 – Image Translation Using an Autoencoder.

Figure 20 – Image Translation Using an Autoencoder with Additional Global Transformations.

Figure 21 – Image Generation Using a GAN.

Figure 22 – Image Generation Using a GAN.

Figure 23-- Training the Translator using unpaired data.

Figure 24 – Enriching the Training Process of the Translator using Generated Data.

Figure 25 – Enriching a Data Set with Generated Data.

SYSTEMS AND METHODS FOR DEEP MODEL TRANSLATION GENERATION

CROSS-REFERENCE TO RELATED APPLICATIONS

This application claims priority under 35 U.S.C. § 119(e) to U.S. Provisional Patent Application No. 62/395,841, entitled "Systems and Methods for Deep Model Translation Generation1," filed Sep. 16, 2016.

GOVERNMENT RIGHTS

This invention was made with government support under Contract No. FA8650-15-C-7552 awarded by the United States Air Force. The government has certain rights in the invention.

FIELD OF THE INVENTION

Embodiments of the present invention relate to systems and methods for improving the training of machine learning systems to recognize certain objects within an image. In this context, an "object" is typically a region of an image or a set of regions corresponding to a physical object that can be recognized within a collection of image data. Training a machine learning system to recognize objects within images is not the only application of the present invention. Although object terminology and image terminology will be used frequently herein for convenience, those of skill in the art will understand that the present invention applies to any pattern that can be recognized within a collection of data.

Embodiments of the present invention relate to systems and methods that reduce the amount of data required to train a machine learning system by means of image translation and image generation using deep learning.

Embodiments of the present invention relate to systems and methods for improving the training of machine learning systems to recognize certain objects within a given image, where the number of real-world training images is sparse, but the number of synthetically derived training images is comparatively dense.

More particularly, embodiments of the present invention relate to systems and methods for improving the training of machine learning systems to recognize certain objects within a given image, by training a machine learning system using a set of realistic training images, where the set of realistic training images is created by a process that includes translating a set of synthetic training images into more realistic training images.

Still more particularly, embodiments of the present invention relate to systems and methods for improving the training of machine learning systems to recognize certain objects within a given image, where the creation of realistic training images includes pairing certain real-world training images with certain synthetic training images and where the pairing enables a convolutional autoencoder to translate a set of input synthetic training images into a corresponding output set of more realistic training images.

Even more particularly, embodiments of the present invention relate to systems and methods for improving the training of machine learning systems to recognize certain objects within a given image, where the volume of a realistic training image data set is further enriched by a generative adversarial network ("GAN") before being provided as training data to a machine learning system.

BACKGROUND

Machine learning is a subfield of computer science that gives computers an ability to recognize certain patterns of data without being explicitly programmed to do so. Machine learning algorithms typically operate by building a computational model to recognize patterns of data by training the model with a set of example patterns collected from real-world efforts. However, in certain machine learning applications, it can be difficult or infeasible to collect a sufficient number and/or variation of high-quality real-world training examples to adequately train a machine learning system. In these situations, machine-learning systems can be trained with synthetic computer-generated examples. Synthetic examples are often inadequate, however. Almost always, there is a significant difference between an actual real-world data example and a synthetic computer-generated example, and that difference can be important for training a machine learning system.

Object recognition, as described in this invention, is the act of recognizing given objects in an image. Part of the object recognition task is classifying objects as particular types. Therefore, "classification," as it relates to machine learning, is described here in more detail as follows.

"Classification" is a task in the field of machine learning where unknown or unclassified objects or images of objects are grouped into collections of known or classified objects or images of objects. The known collections are called "classes." Each class is denoted by the term $c_n$, where $c_n \subseteq C$ (C is the set of all classes $c_n$) and each $c_n$ has a set of features $f_m$ where $f_m \subseteq F$. Given C, there should be enough distinction between $c_0, c_1, \ldots c_n$ such that a set of lines exists that can divide $c_0, c_1, \ldots c_n$ from each other. This quality of distinction is called linear separability. Classes that are linear separable are those that can be separated by straight lines. Classes that are not linear separable are those that cannot be separated by straight lines. Instead, classes in C can be separated by non-linear (e.g., curved) boundaries. FIG. 17 and FIG. 18 illustrates the difference between classes that are linear separable (FIG. 17) and classes that are not linear separable (FIG. 17). Both FIG. 17 and FIG. 18 are further described below.

A common way to identify or classify data is to use a machine learning technique. In machine learning, computers are used to classify, predict or infer new facts based on an internal representation. This representation is quite often based on training a machine learning algorithm using existing data that bears some similarity to the data that is unknown.

Training a classifier (e.g., a machine learning system that will classify or recognize objects) entails defining an appropriate machine learning algorithm, defining that algorithm's parameters, and establishing a data set that will best represent the space of objects to be classified. For example, if a goal is to classify types of pets, the training data should contain a sufficient number of examples of pets that will need to be classified. A classifier that is missing examples of fish but has examples of dogs and cats, may not be able to sufficiently classify fish.

Given a data set of images, to use these images for a given task, for example, the task of classification, the quality of the classification is a function of the quantity of each type of object in the image set used to train the image classifier.

The quality of the data is also important. For example, if the goal of the classifier is to classify images of pets, if the set of images contains image samples for a particular type that is not clean, then the classifier may not accurately classify unseen pets of that type. An unclean image might include characteristics such as the following:
- Noisy Backgrounds—Lots of other information in the image that clutters the image;
- Obfuscation—The actual object is obfuscated in some way (e.g., it is in a shadow);
- Distortion—The actual object is distorted in some way; or
- Bad Perspective—The perspective of the actual object is not consistent with samples to be classified.

Therefore, given a data set of images, to use these images for a given task, for example, the task of classification, the quality of the classification is a function of quantity of each type of object and the overall quality of the image set used to train the image classifier.

Given a data set that is not sufficiently sized or contains training samples that underrepresent the actual objects that need to be classified, then different measures may be taken to overcome these problems:
1. De-noise or declutter the image.
2. Extract just the main object from the image and create new images containing just that object, for example, a dog.
3. Create duplicates of images in the training data set that are considered 'good' representatives of the types of objects that will be classified.
4. Take these 'good' representatives and change them just enough to make them different from the original.
5. Use data from other data sources to supplement the training data set.
6. Take images from a different data set that are perhaps similar in some way and make them look like the images in the training data set.

Exploring the use of 'good' candidate images and creating duplicates that are transformed enough to call them different can produce transformed images that can be used to supplement the data set. Transformations can include applying simple mathematical operations to the images, histogram modifications, interpolation, rotations, background removal, and more.

Such transformations can improve classification under certain circumstances but performance gains are often minimal.

More importantly, data acquisition typically implies more cost, as data acquisition and data preparation can be costly. Synthetic approaches and data transformations also result in higher cost with usually a lower payoff as these methods are inferior to the true data samples. Adapting other data sets to mimic the data required to train the machine learning method, again implies high costs, as this process involves some mechanism to create the synthetic examples.

A key ingredient for deep learning is the data. Deep learning algorithms tend to require more data than the average machine learning algorithm in order to learn data representations and features.

Machine Translation

Machine translation ("MT") [see endnote 2] is part of Computational Linguistics, a subset of Natural Language Processing, and it implies a machine is assisting with the translation of either text or speech from one language to another. MT can involve simple word substitution and phrase substitution. Typically, statistical methods are used to perform MT. In certain embodiments, we apply machine translation to images by means of deep model translation.

Autoencoders

An autoencoder [see endnote 3] is an unsupervised neural network that closely resembles a feedforward non-recurrent neural network with its output layer having the same number of nodes as the input layer. Within the autoencoder, the dimensionality of the data is reduced to a size much smaller than the original dimensions. This reduction is often called a "bottleneck." The encoder flattens or compresses the data into this smaller bottleneck representation. The decoder then tries to recreate the original input from this compressed representation, producing a representation that is equal to the size of the input and similar to the original input. The better the performance of the autoencoder, the closer the recreated output is to the original input.

Formally, within an autoencoder, a function maps input data to a hidden representation using a non-linear activation function. This is known as the encoding:

$$z=f(x)=s_f(W_x+b_z),$$

where the function $f$ maps input x to a hidden representation z, $s_f$ is a non-linear activation function, and W and b represent the weights and bias.

A second function may be used to map the hidden representation to a reconstruction of the expected output. This is known as the decoding:

$$y=g(z)=s_g(W'_z+b_y),$$

where g maps hidden representation z to a reconstruction of y, $s_g$ is a non-linear activation function, and W and b represent the weights and bias.

In order for the network to improve over time, it minimizes an objective function that tries to minimize the negative log-likelihood:

$$AE(\theta)=\Sigma_{x \in D_n}L(x,g(f(x))),$$

where L is the negative log-likelihood and x is the input.

There are different variants of autoencoders: from fully connected to convolutional. With fully connected autoencoders, neurons contained in a particular layer are connected to each neuron in the previous layer. (A "neuron" in an artificial neural network is a mathematical approximation of a biological neuron. It receives a vector of inputs, performs a transformation on them, and outputs a single scalar value.) With convolutional layers, the connectivity of neurons is localized to a few nearby neurons in the previous layer. For image based tasks convolutional autoencoders are the standard. In embodiments of this invention, when autoencoders are referenced, it is implied that the convolutional variant may be used.

Generative Adversarial Networks ("GANS")

A generative adversarial network ("GAN") [see endnote 1] is a network made of two deep networks. The two networks can be fully connected where each neuron in layer l is connected to every neuron in layer l-1, or can include convolutional layers, where each neuron in layer l is connected to a few neurons in layer l-1. The GANs used in embodiments of the invention encompass a combination of fully connected layers and convolutional layers. One of the networks is typically called the discriminative network and the other is typically called the generative network. The discriminative network has knowledge of the training examples. The generative network does not, and tries to 'generate new samples,' typically beginning from noise. The generated samples are fed to the discriminative network for evaluation. The discriminative network provides an error measure to the generative network to convey how 'good' or 'bad' the generated samples are, as they relate to the data distribution generated from the training set.

Formally, a generative adversarial network defines a model G and a model D. Model D distinguishes between samples from G and samples h from its own distribution.

Model G takes random noise, defined by z, as input and produces a sample h. The input received by D can be from h or h. Model D produces a probability indicating whether the sample is input that fits into the distribution or not.

Variations of the following objective function are used to train both types of networks:

$$\min_G \max_D \mathbb{E}_{h \sim p_{Data}(h)}[\log D(h)] + \mathbb{E}_{z \sim p_{Noise}(z)}\log(1 - D(G(z)))$$

SUMMARY OF THE INVENTION

Embodiments of the invention provide a way to reduce the cost of data acquisition for image recognition tasks by improving training through an augmentation process that involves supplementing and/or augmenting training image data sets with automatically generated synthetic images using two distinct and complementary methods: translation and generation. Both of these methods are incorporated into embodiments of the invention that we call Deep Image Model Translation Generation ("DMTG").

First by translating images that are statistically different, embodiments of invention can use image translation to improve image recognition tasks by using translated images to supplement the target training data set, thus converting a sparse training data set into a comparatively dense training data set. FIG. 12, described in more detail below, illustrates the interactions between image translation and object recognition.

Image translation applies the theory of machine translation to translate images of one data set (input data set) into images of another data set (target data set). This technique can be used to translate images of lower quality or lower resolution into images of a higher quality or higher resolution. It can also be used to translate noisy images with clutter to images without clutter. It is a revolutionary way to improve the overall quality and quantity of the training data set to be used for classification.

Second, embodiments of the invention can significantly increase the size of a training data by generating images that are similar to each image in the training data set. FIG. 13, described in more detail below, illustrates the interactions between image generation and object recognition.

Typical image generation methods used to supplement training data sets include duplication and transformation. These methods offer minimal performance gain.

Image generation embodiments assume, given some point in space, i.e., an image, other images exist that are unknown, or not seen, which are variations of that same image. These embodiments find other images surrounding a 'known' image and generate images around that known image to supplement the image data set. The result is that tens of thousands of images based on each 'known' image can be created, hence providing a truly innovative way to supplement the training data set.

Image translation and generation work together to improve classification, and hence object recognition, further. FIG. 14, described in more detail below, illustrates how image translation and generation can be used to support object recognition tasks.

Translated images or existing images contained in the training data set can be used to improve the quality of the generated images by initiating the generative process with this known knowledge.

In addition, generated images have the potential to be used as a feedback into the translation process to move the translated images closer to the true images of the original training data distribution.

Together these methods are able to convert images that are inferior in some way to the target image data set, into images that are similar enough to the target image data set that they could be used to supplement the original training image data set, thus enabling a resulting object recognition method to reach higher performance levels with significantly less real-world training data.

The acquisition of large image data sets can be costly. The time to acquire and preprocess real-world data in order for the data to be suitable for an image recognition task involves many hours of work. The embodiments described herein can reduce the amount of real-world data required for object recognition without compromising performance.

The above summaries of embodiments of the present invention have been provided to introduce certain concepts that are further described below in the Detailed Description. The summarized embodiments are not necessarily representative of the claimed subject matter, nor do they limit or span the scope of features described in more detail below. They simply serve as an introduction to the subject matter of the various inventions.

BRIEF DESCRIPTION OF THE DRAWINGS

So that the manner in which the above recited summary features of the present invention can be understood in detail, a more particular description of the invention may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DESCRIPTION OF THE EMBODIMENTS

Figure 1:
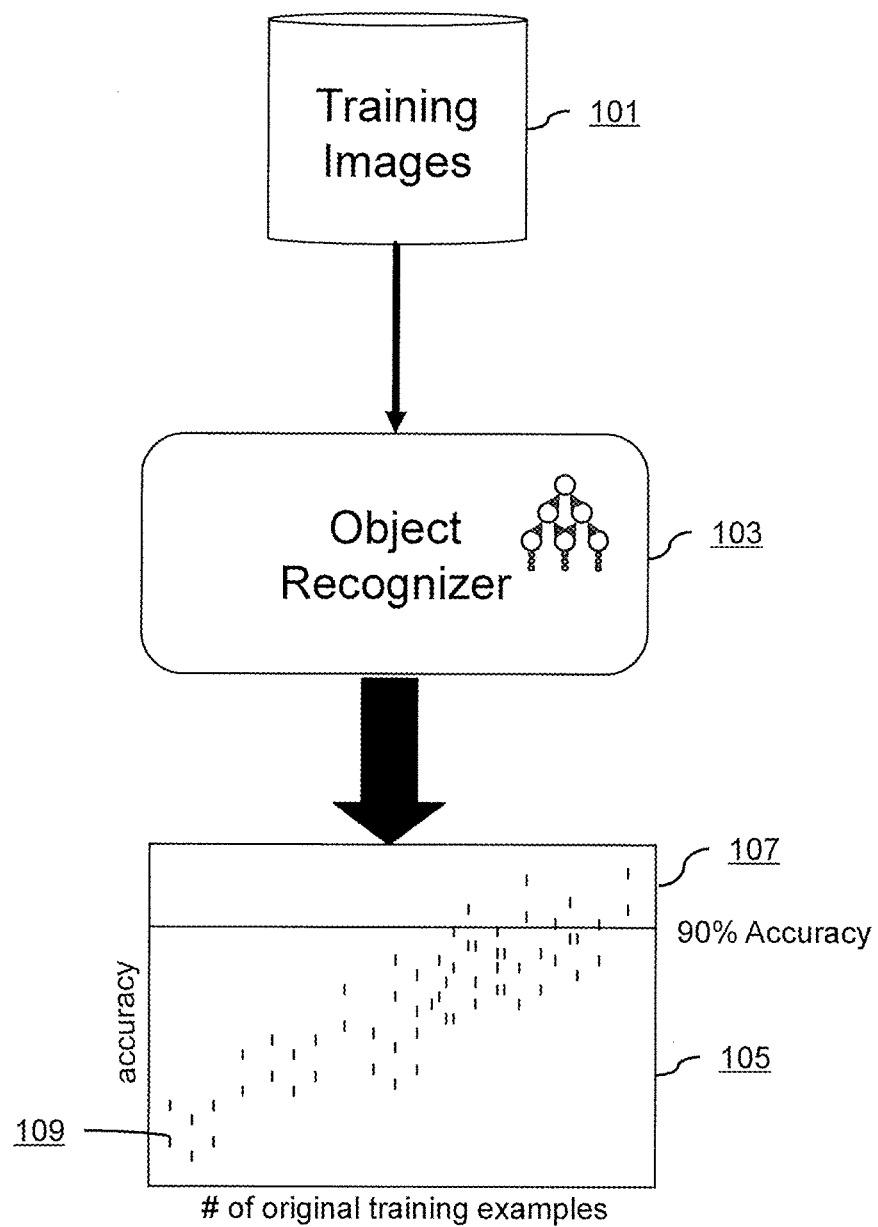
FIG. 1 is a block diagram illustrating how an object recognizer given a well-balanced sufficiently sized training data set may produce accuracy rates that increase as the number of training examples increase, when recognizing objects in an unknown set of images.

Embodiments of the present invention will be described with reference to the accompanying drawings, wherein like parts are designated by like reference numerals throughout, and wherein the leftmost digit of each reference number refers to the drawing number of the figure in which the referenced part first appears.

Overview

One goal of Deep Image Model Translation Generation ("DMTG") is to improve the training of a machine learning system by generating a large volume of synthetic training images using deep image translation and/or deep image generation techniques, where the process of obtaining training images from real-world sources would be difficult and/or costly. Embodiments of the invention address three main problems: (1) lack of usable data to sufficiently train an object recognizer, thereby producing lower accuracies when using the object recognizer to detect objects; (2) certain classes of objects may not be sufficiently represented in the training data set, which may produce an object recognizer that cannot sufficiently recognize all objects for which it was intended to recognize; and (3) poor quality of training data may produce a poorly trained object recognizer that results in lower accuracy rates.

To sufficiently recognize objects in an image, the various classes of objects to be recognized must be sufficiently represented in the training data set. Large image-based training data sets are often hard to acquire. Even under the best of circumstances a significant amount effort must be exerted to prepare data sets such that they can be used to train a machine learning system. If relevant training data is not available, then synthetic data may be adapted and substituted for the real data. Data that is labeled, i.e., the objects are identified as belonging to a specific category, providing the machine learning system with 'ground truth', can also present an acquisition challenge. Without a sufficiently sized training data set, performance can be hindered when applying the trained machine learning system to unseen or unknown images for object identification.

In other cases, training data sets may be considered unbalanced or biased towards certain classes. Hence object recognition performance will be biased more toward the classes that are more sufficiently represented than the classes that are less sufficiently represented.

FIG. 1 is a block diagram illustrating how an object recognizer 103 that is given a well-balanced sufficiently sized training data set 101 can produce a plot of accuracy rates 105 (object recognition performance) that increase as the number of training examples 109 increase, when recognizing objects in an unknown set of images. Points 109 show lower accuracy given a smaller number of training examples. As the number of examples increases 107, the accuracy will increase because the number of classes will be more sufficiently represented. For deep learning problems, this is of particular importance, as deep learning algorithms tend to require significantly more training data than a typical supervised machine-learning algorithm.

Figure 2:
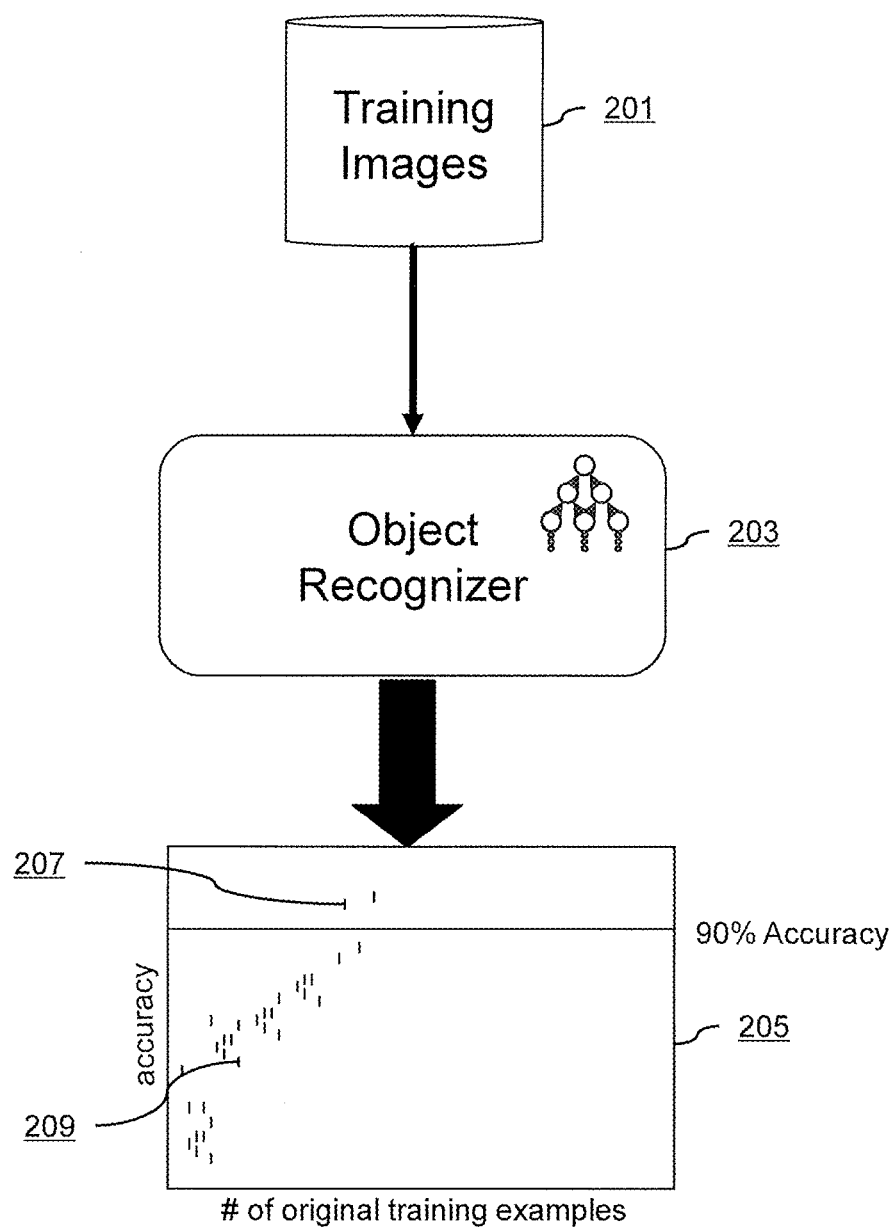
FIG. 2 is a block diagram illustrating how an object recognizer given a sparse unbalanced training data set may produce accuracy rates that are lower for most images of an unknown set of images, even as the number of training examples increases, particularly for objects corresponding to types of classes that were under-represented in the training data set.

FIG. 2 shows how accuracy may be hindered by sparse or unbalanced training data. FIG. 2 is a block diagram illustrating how an object recognizer 203 given a sparse unbalanced training data set 201 can produce a plot of accuracy rates 205 that are lower for most images of an unknown set of images, even as the number of training examples increases, particularly for objects corresponding to types of classes that were under-represented in the training data set. Given a training data set 201 that is sparse and/or unbalanced, the performance 205 of the object recognizer 203 is likely to not reach accuracy levels reached in FIG. 1 even as the number of examples increase. Hence the majority of images to be classified will be incorrectly classified 209 and very few will be accurately classified 207. Points 209 represent lower recognition accuracy due to an under-representation of class examples. Points 207 show that even as the number of training examples increases, the accuracy will remain low for under-represented classes.

Figure 3:
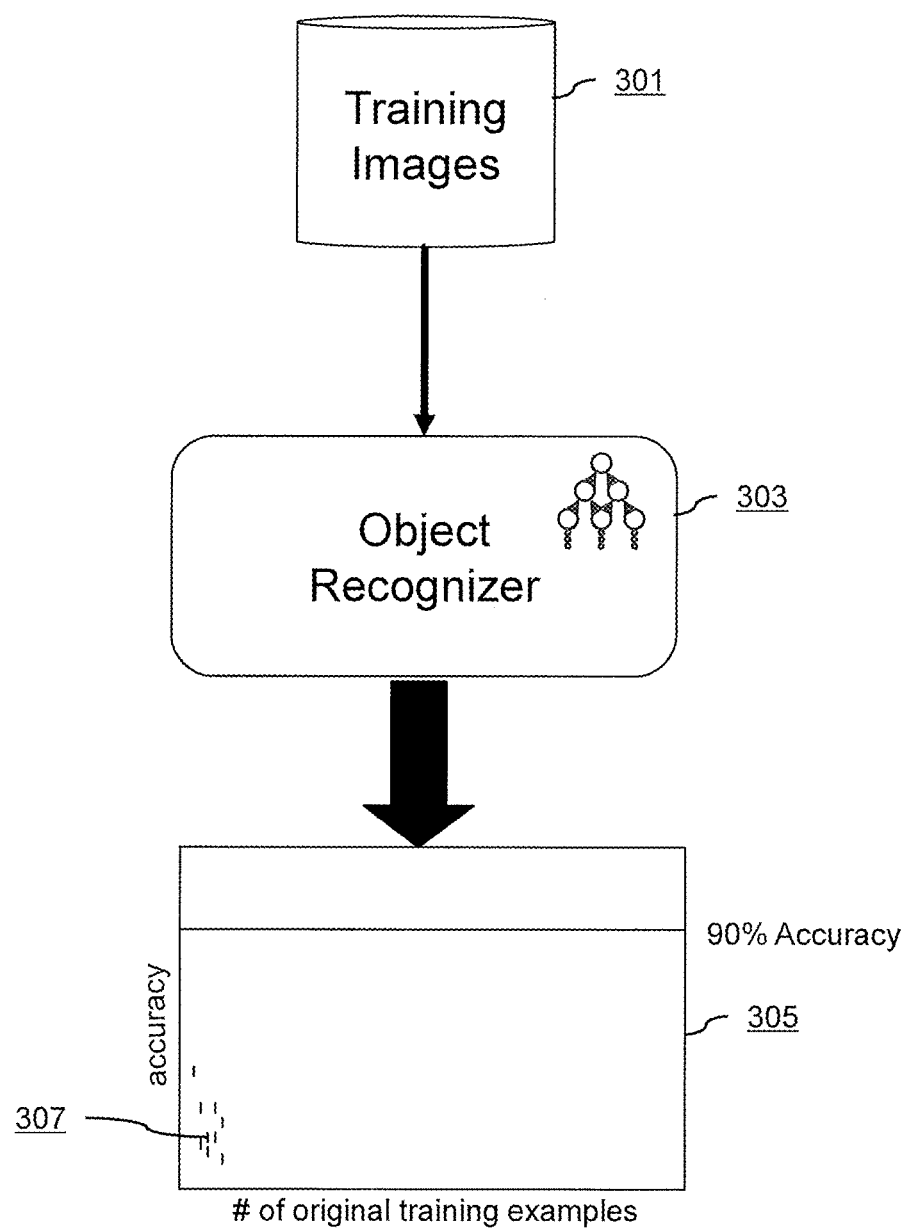
FIG. 3 is a block diagram illustrating how an object recognizer given missing classes, sparsity, and unbalanced training data may produce accuracy rates that are low for the majority of images recognized, given an unknown set of images. Even as the number of training examples increases, accuracy rates tend to remain low.

Certain classes of data may not be represented at all. FIG. 3 is a block diagram illustrating how an object recognizer 303 given missing classes, sparsity, and unbalanced training data 301 may produce accuracy rates 305 that are low for the majority of images recognized, given an unknown set of images. As shown in FIG. 3, the lack of certain classes can be worse than unbalanced training data, as in this situation the training data set 301 will have certain classes that are not represented at all. Hence the object recognizer, 303 will fail to recognize those classes. Even as the number of training examples increases, accuracy rates tend to remain low, because the majority of unrepresented classes are not likely to be accurately classified. Points 307 shows this is the most unsuitable type of data set, as classes may have zero or very few training examples.

In addition to missing or inadequately represented classes, the quality of the training data could be problematic. If images are of a poor quality, this could affect the performance of the object recognition method. Poor quality data could mean the objects are blurry, obfuscated in some way, or hard to identify due to the perspective of the object in the image. In addition, there could be significant noise in the image or other objects that affect the overall quality.

The best way to overcome issues such as these is to require less training data but achieve the same (or better) object recognition performance.

Embodiments of the present invention provide two methods to achieve object recognition performance by requiring less training data and overcoming the issues often found among training data.

Figure 15:
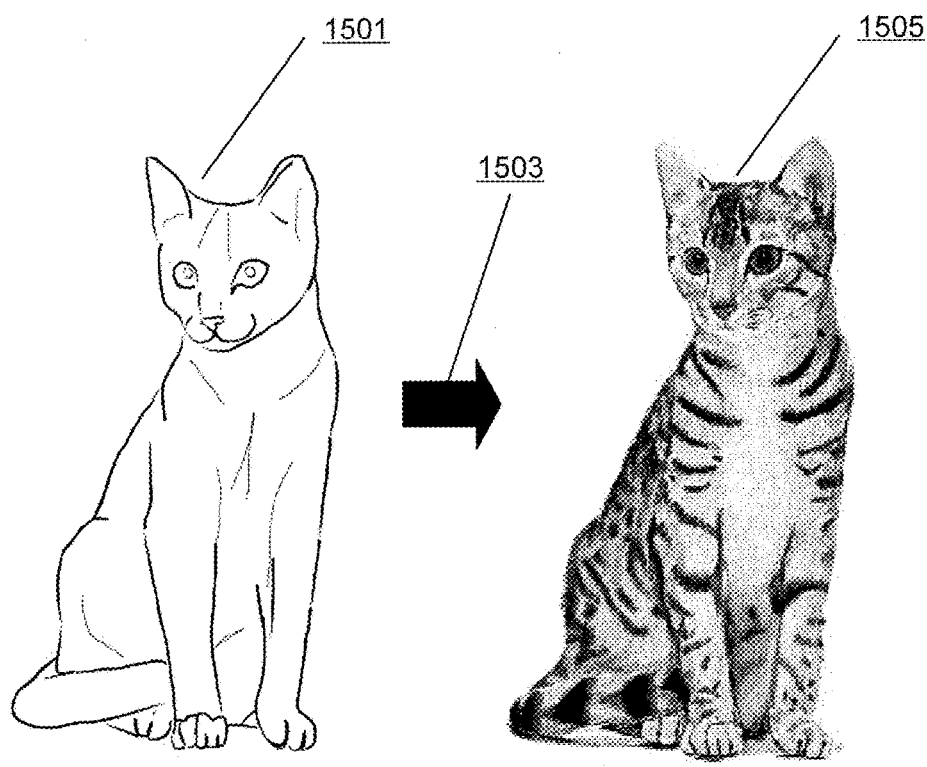
FIG. 15 illustrates an example result of a translation process from a synthetic image of a cat to a photo realistic image of a cat, according to an embodiment of the invention.
Figure 16:
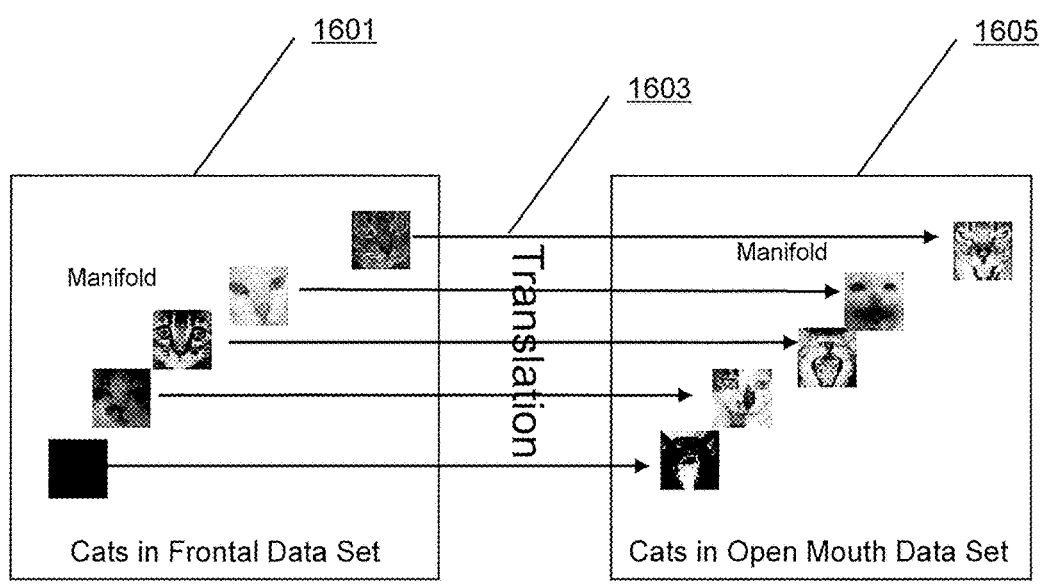
FIG. 16 illustrates an example translation process where a set of images on one manifold are translated into a set of images which exist on a different manifold, according to an embodiment of the invention.

The first method described—Deep Model Image Translation—enables translation from one object to another. The translation can be applied to a set of images from one domain to be translated to a different domain as shown in FIG. 15 where drawings of cats 1501 can be translated 1503 as photo realistic images of cats 1505. The translation can be applied to a set of images of a particular class translated to a set of images of another class as shown in FIG. 16 where 1601 represents domain to translate from, 1603 is the translation process and 1605 represents the domain to be translated to. This in particular addresses data set sparsity, unbalanced class representation and data set adaptation.

Figure 25:
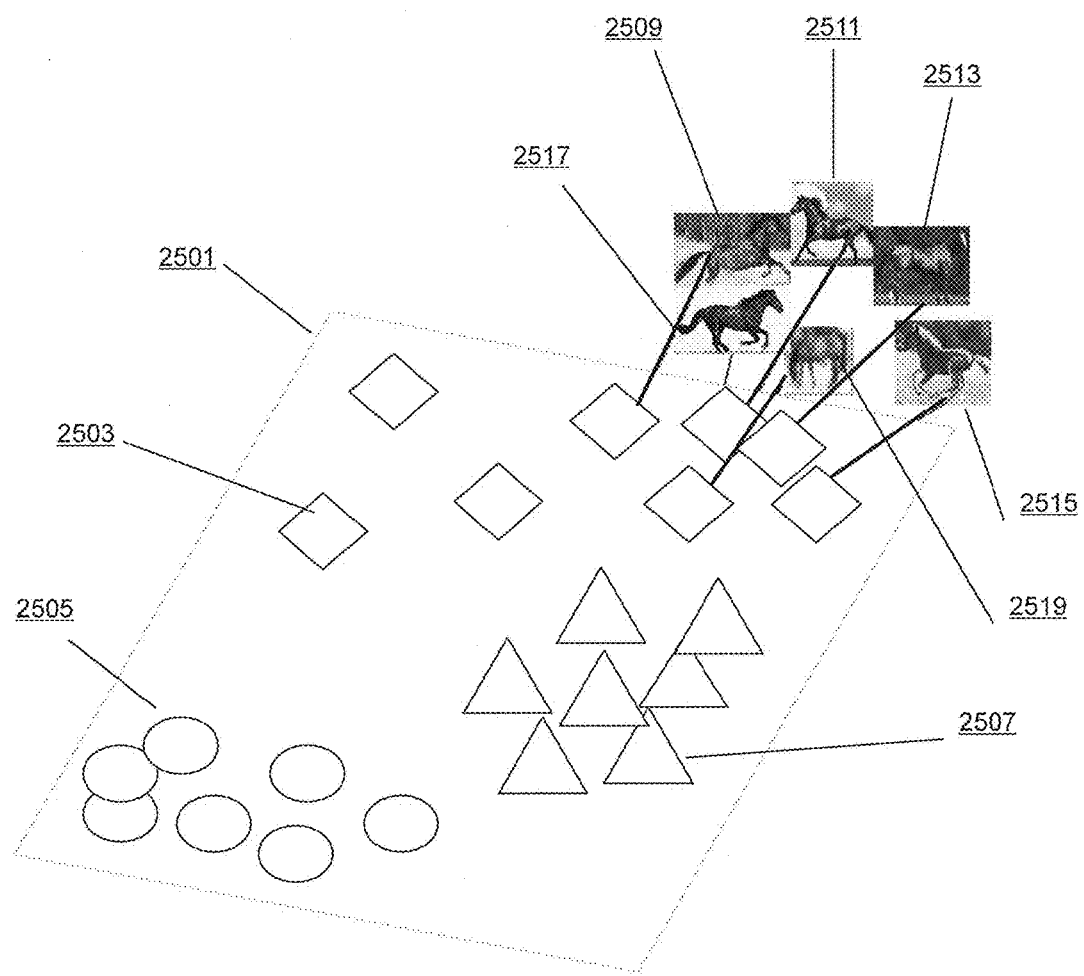
FIG. 25 shows the effects of image generation on a set of 3 classes of images, according to an embodiment of the invention.

The second method described—Deep Model Image Generation—enables the generation of images similar to a given image. The generated images are not the original images with some global transformation applied. Rather, the generated images are new images that were not previously represented. FIG. 25 depicts a data set with a sparsely defined class 2503 and examples of 'generated' images (2509, 2511, 2513, 2515, 2517, 2519). This embodiment takes advantage of the theory of image manifolds [see endnote 5] and generates images that are similar to a given image with slight variations.

Figure 11:
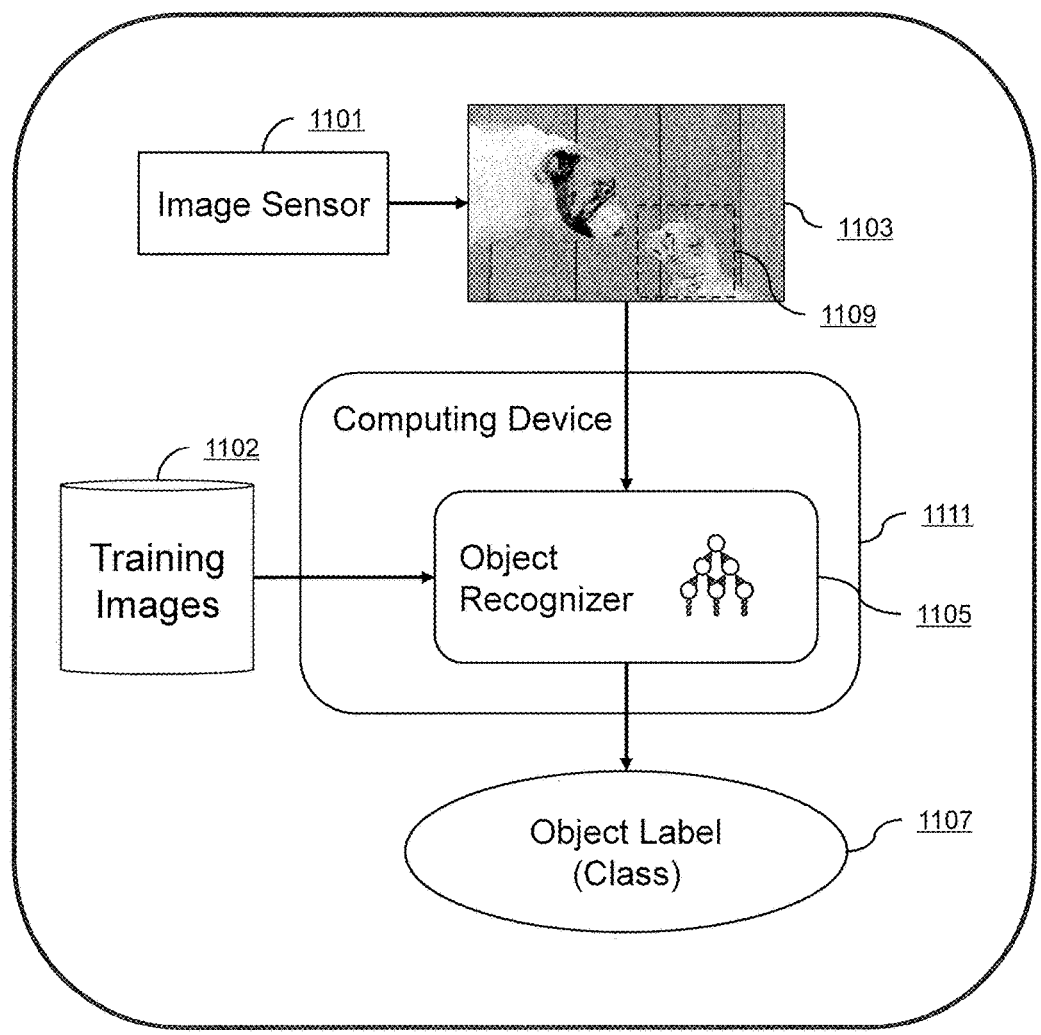
FIG. 11 is a block diagram of an embodiment illustrating the process of recognizing objects using the object recognizer.

Both of the aforementioned methods—Deep Model Image Translation and Deep Model Image Generation—can be used to improve the object recognition process. In FIG. 11, object recognition in its basic form is shown. Given an image 1103, the object recognizer 1105 which is a deep neural network, tries to identify an object 1109 in image 1103 based on the classes 1107 it has been trained to recognize.

Figure 4:
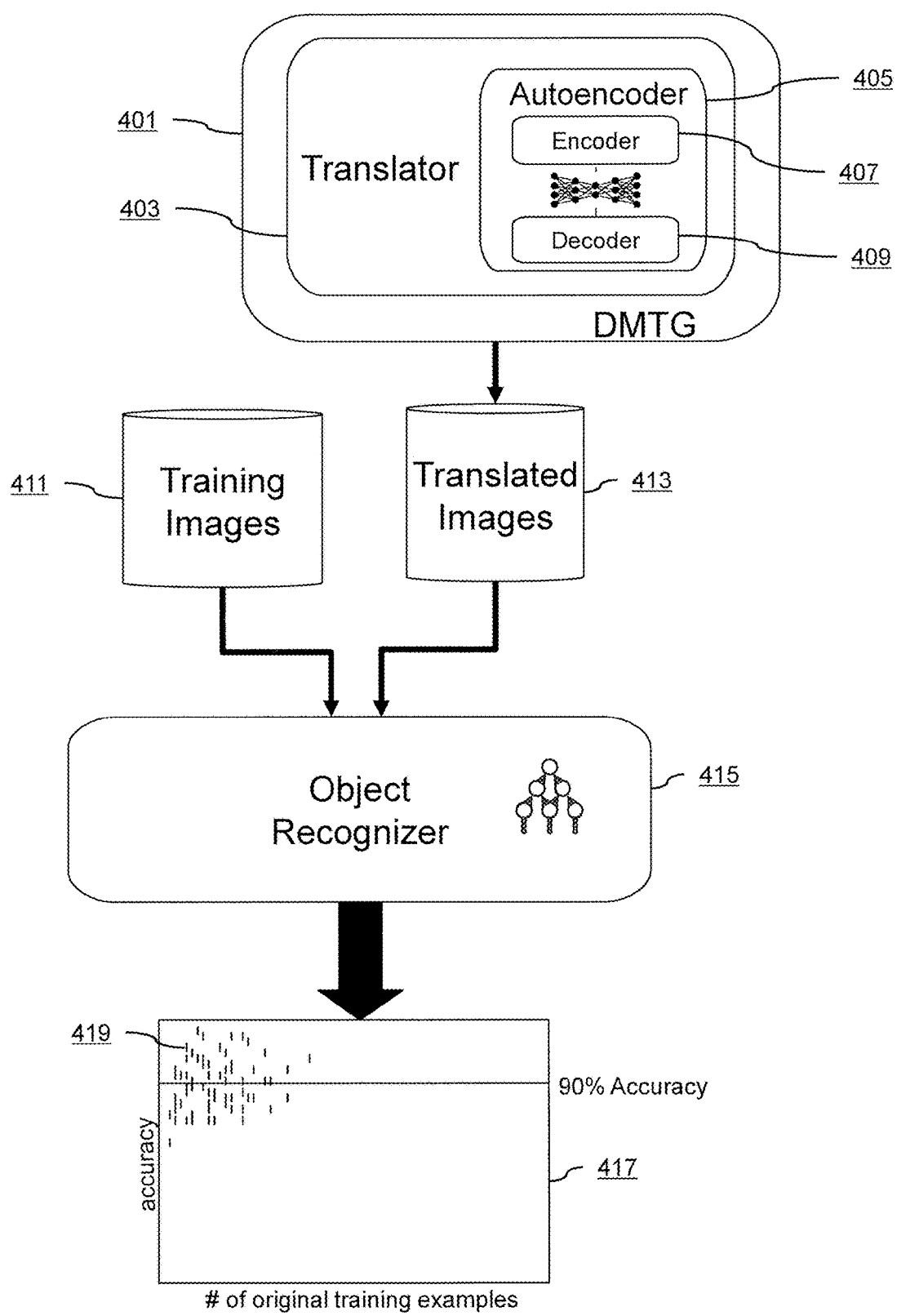
FIG. 4 is a block diagram illustrating how an object recognizer's performance can be improved by using image translation in addition to the original training data set.
Figure 6:
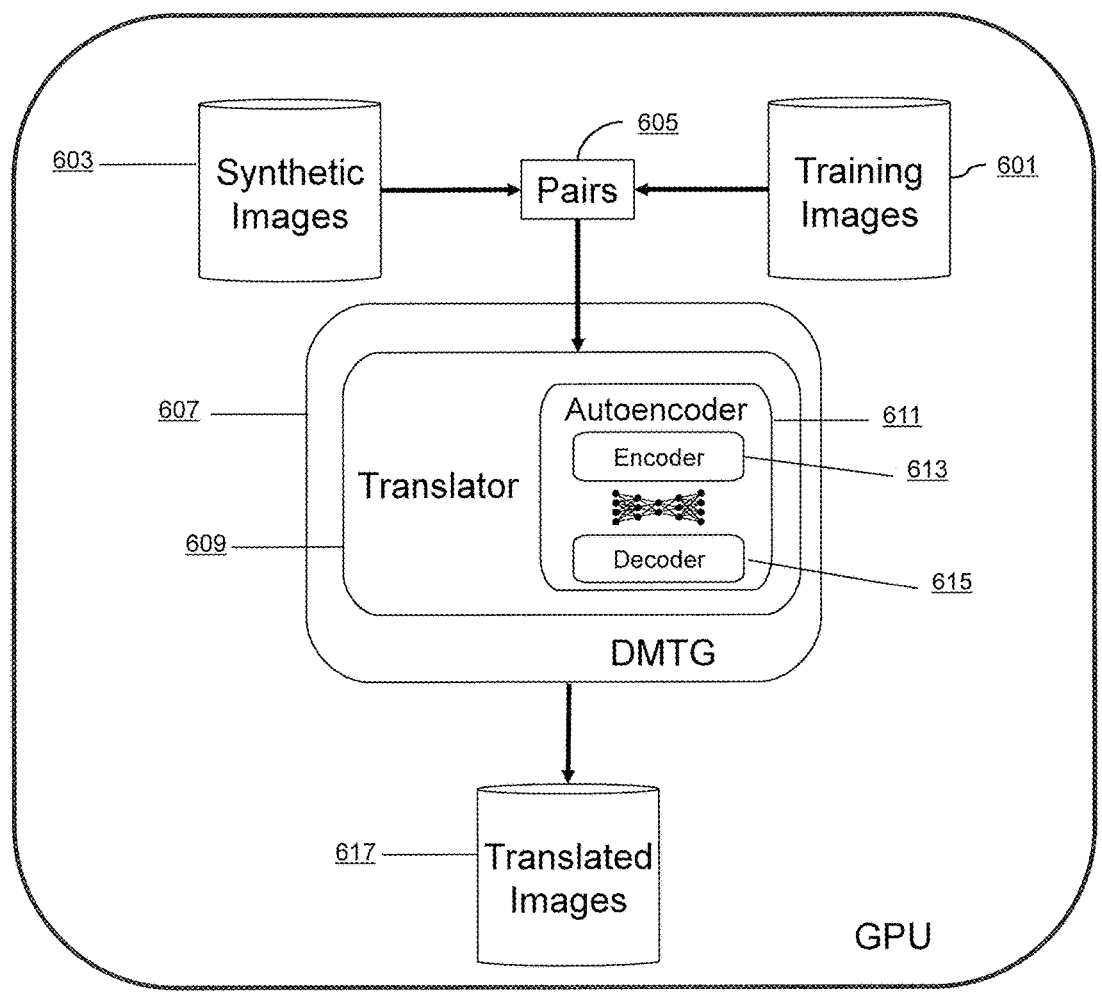
FIG. 6 is a block diagram illustrating an embodiment comprising training a DMTG translator.
Figure 12:
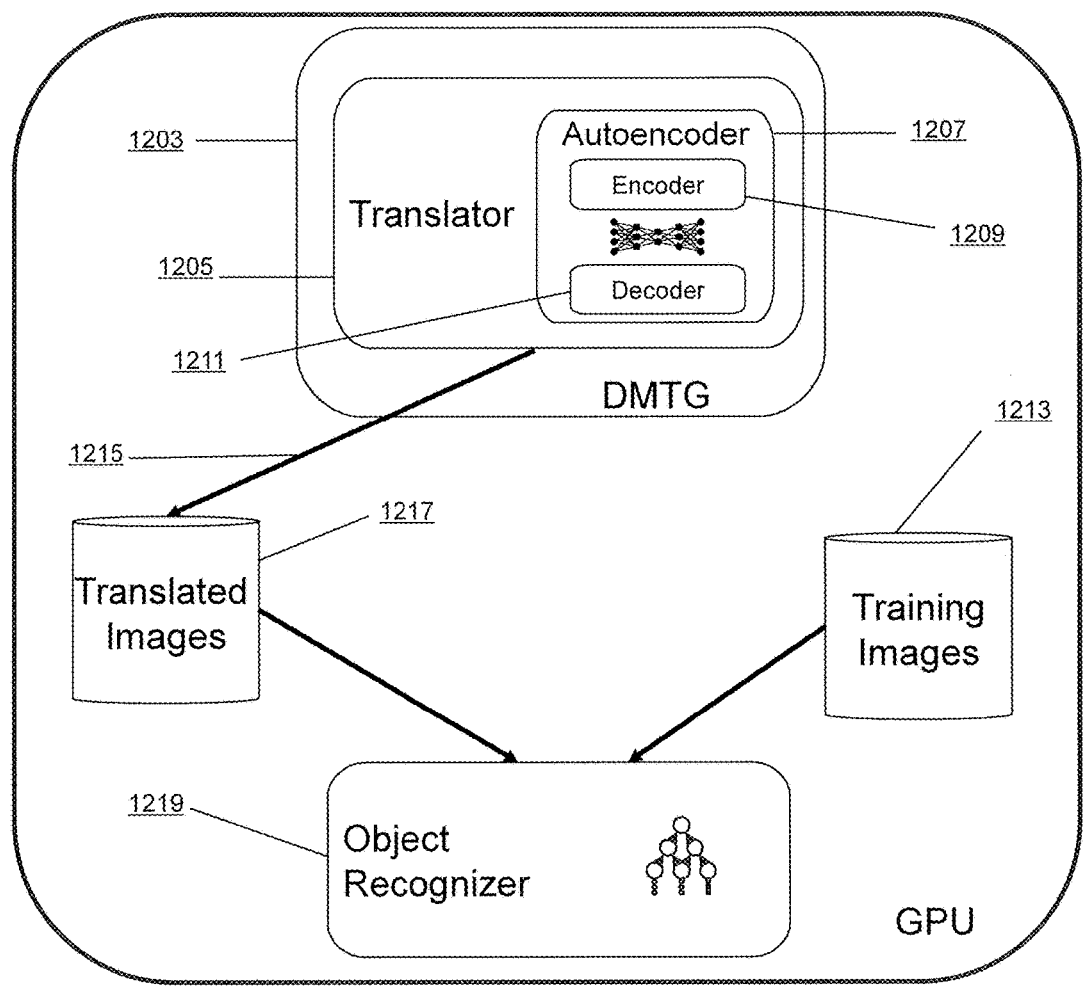
FIG. 12 is a block diagram of an embodiment illustrating the process of training an object recognizer using translated images in addition to training images.

In one embodiment, as shown in FIG. 4, a translator 403 can be used to generate a set of translated images 413. When an object recognizer uses real-world training images and translated images together, higher accuracy rates 419 can be achieved with fewer samples of the original data set 417. This method is particularly suitable for methods that require very large amounts of data, for example deep learning neural networks (a subset of machine learning) but the technique could be applied to any machine learning problem. The basic process flow for training the translator, as shown in FIG. 6 is for a set of synthetic images 603 to be paired 605 with training images 601. The translator 609 is then trained to produce a network that can then be called upon with any unpaired synthetic image to produce a translated version of the image. As depicted in FIG. 12 an object recognizer 1219 can be trained using the translated images in addition to a set of training images. In FIG. 6, two different data sources are shown, but as mentioned they can originate from the same data source. Also note the training images 601 in FIG. 6 may not be the same set of training images 1213 in FIG. 12.

Figure 19:
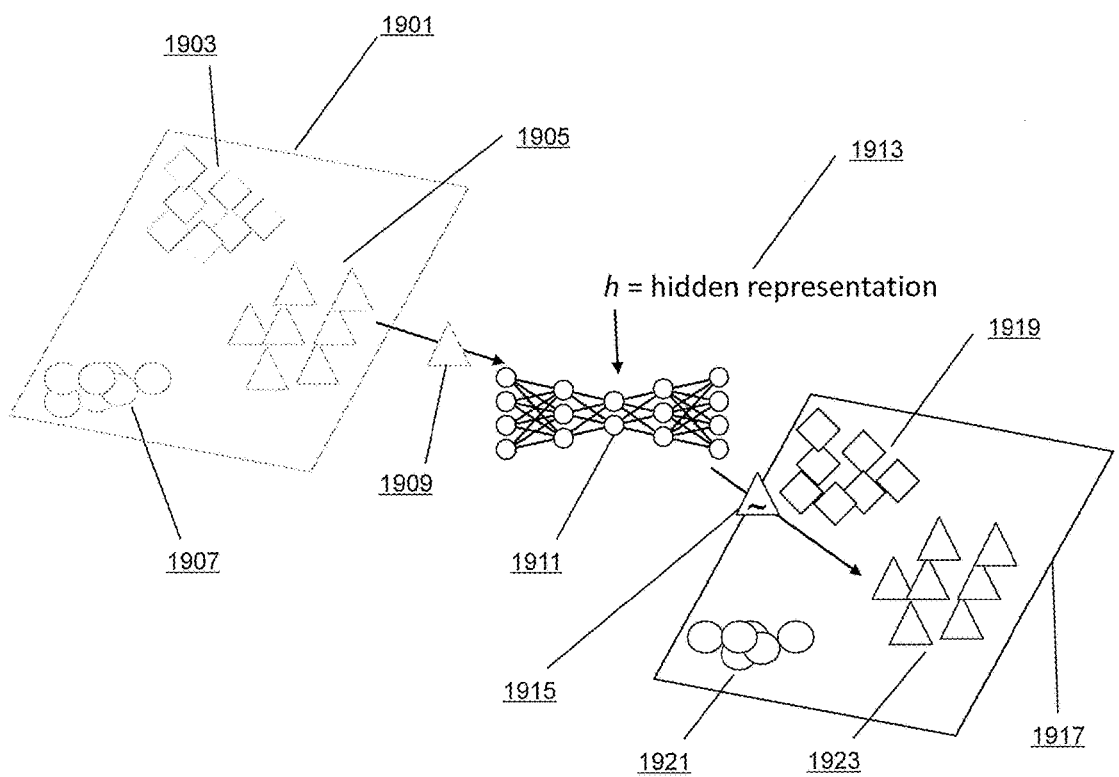
FIG. 19 illustrates a translation process where one domain of images is translated into another domain of images, according to an embodiment of the invention.

As depicted in FIG. 19, a translation process can have two phases. First, an encoder can encode an image into a hidden representation. In the hidden representation, the dimensionality of the encoded image is reduced, which enables certain features of the image to be identified. Then, the encoded representation is decoded into a complete image, completing the translation. This translation process can be performed on an entire set of training images, which enables the network to learn the translation. This training process is based on the pairing mechanisms illustrated in FIG. 6. By using an image pairing technique 605 during training, whereby images from two domains (603, 601) are paired, a translator 609 can be trained to encode the images from one domain into images from another domain. For example, as shown in FIG. 15 an autoencoder might be trained to encode poor quality images of cats (e.g., 1501) into photo realistic images of cats (e.g., 1505).

Deep Model Image Translation

FIG. 4 is a block diagram illustrating how an object recognizer's performance can be improved by using image translation in addition to the original training data set. DMTG 401 includes a translator 403 comprising an autoencoder 405, which includes an encoder 407 and decoder 409. The encoder 407 compresses the data whereby N dimensions are mapped to M dimensions and M<N. The decoder 409 uncompresses the data mapping the M dimensions to N dimensions using a multi-layered convolutional neural network. The original training images 411 and translated images 413 created by 401 are used to train the object recognizer 415. The results of performing object recognition on an unknown data set are shown on graph 417, which plots the objects recognized given the number of training examples and the accuracy. Points 419 show that the object recognizer 415 is able to achieve high accuracy rates with few real-world (original) training examples because the object recognizer 415 was trained with supplemental translated images 413.

Figure 5:
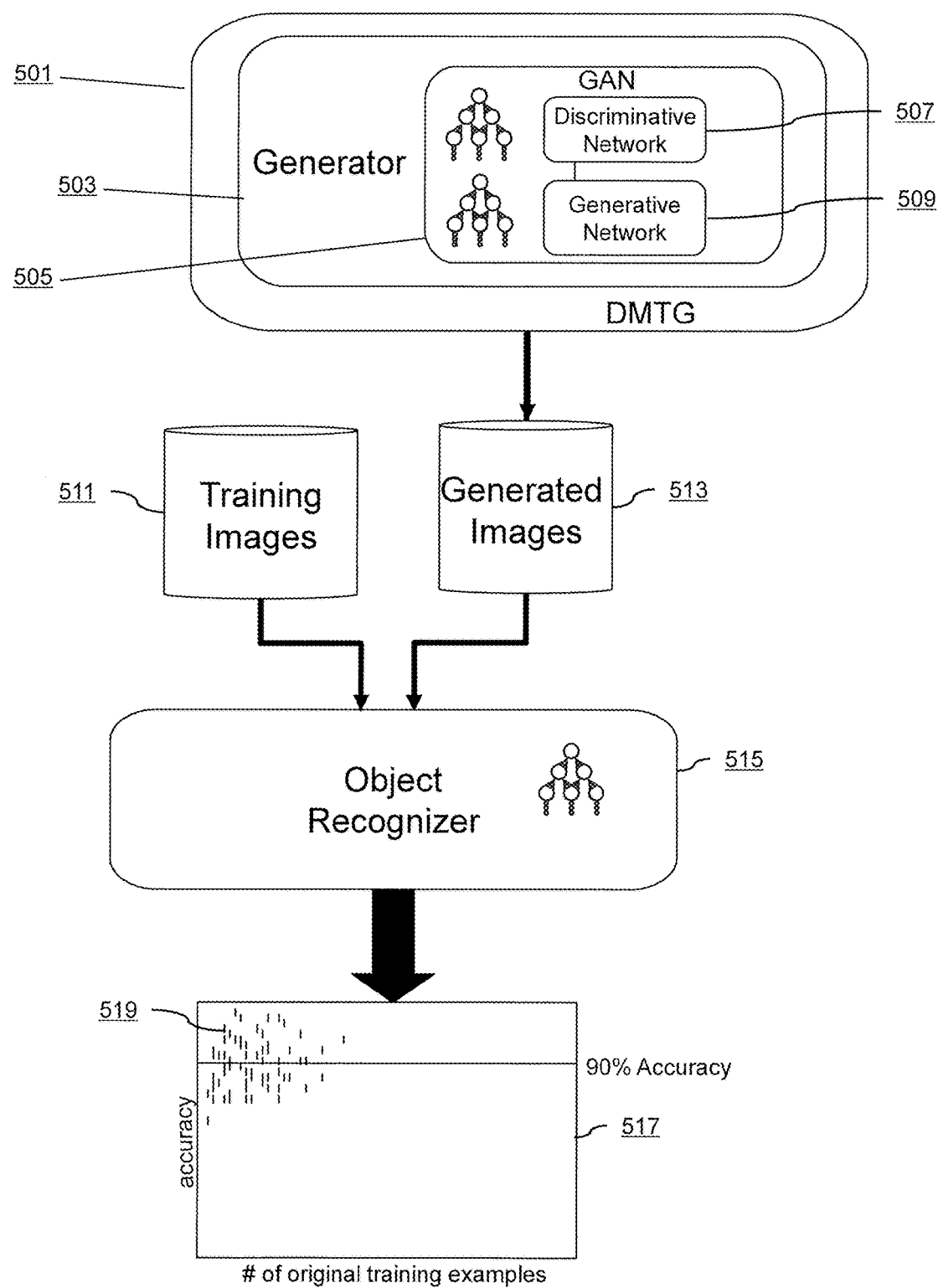
FIG. 5 is a block diagram illustrating how an object recognizer's performance can be improved by using image generation in addition to the original training data set.

FIG. 5 is a block diagram illustrating how an object recognizer's performance can be improved by using image generation in addition to the original training data set. DMTG 501 includes a generator 503 comprising a GAN 505, which includes a discriminative neural network 507 and a generative neural network 509. The original training images 511 and generated images 513 created by 501 are used to train the object recognizer 515. The results of performing object recognition on an unknown data set are shown on graph 517, which plots the objects recognized given the number of training examples and the accuracy. Points 519 on graph 517 show that the object recognizer 515 is able to achieve high accuracy rates with few training examples because the object recognizer 515 was trained with the supplemental generated images 513.

FIG. 6 is a block diagram illustrating an embodiment comprising training a DMTG translator. Given a relatively sparse set of training images 601 and a set of separately created synthetic images 603, a set of image pairings 605 indicates which synthetic images 603 align with corresponding training images 601. The pairings 605 are input to the translator 609, which is part of DMTG 607. The translator 609 comprises an autoencoder 611, which includes an encoder 613 and decoder 615. Encoder 613 compresses the data whereby N dimensions are mapped to M dimensions and M<N. Decoder 615 uncompresses the data mapping the M dimensions to N dimensions using a multi-layered convolutional neural network. Each time an image from synthetic images 603 goes through the encoder 613 and decoder 615, the network in translator 609 learns how to take the compressed information based on a synthetic image 603 to generate a training image such as the training images in 601 based on pairings 605. Once trained, DMTG 607 can be called upon with any unpaired synthetic image to produce a translated version of the image. The output of the translator 609 is a comparatively dense set of translated images 617.

Deep Model Generation

Figure 7:
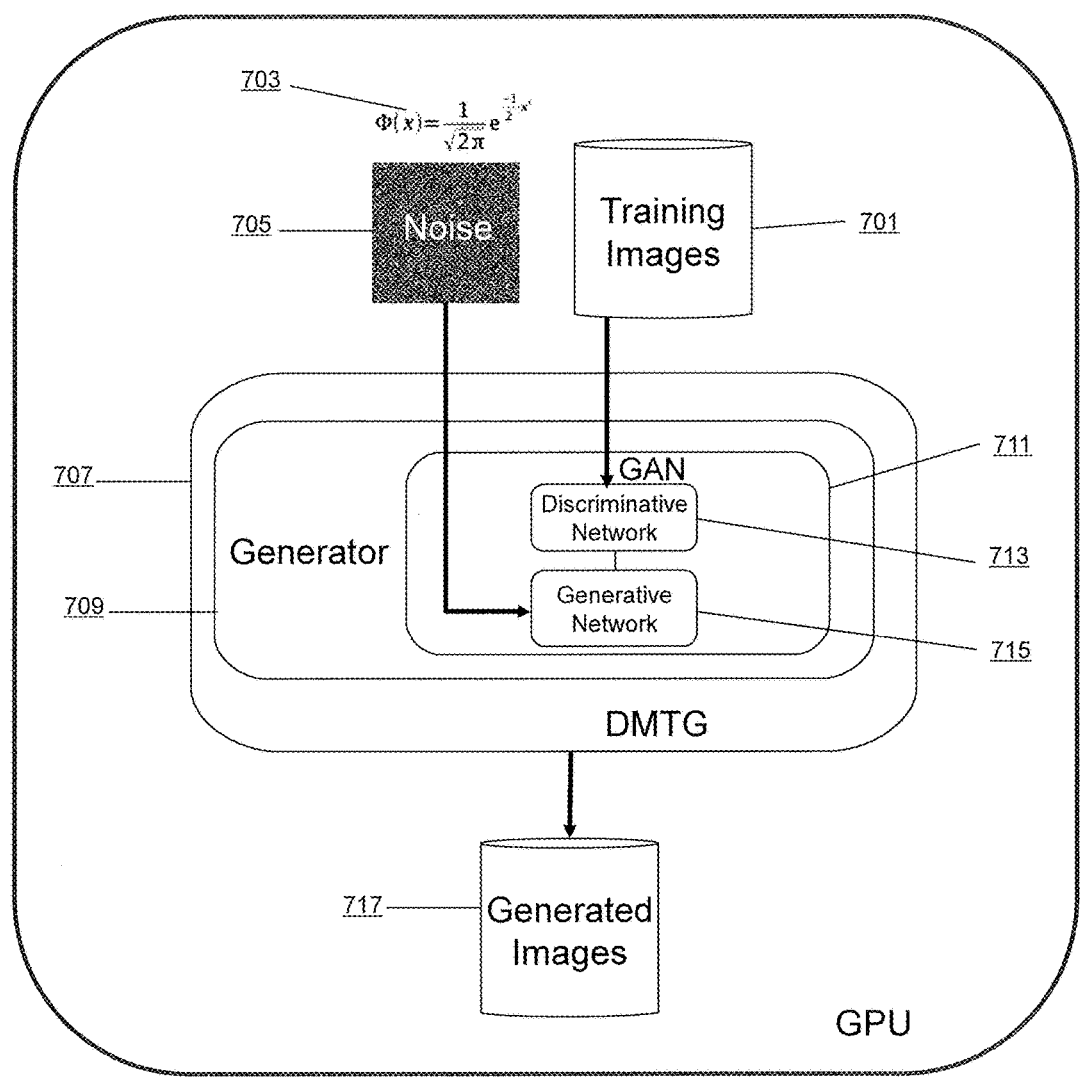
FIG. 7 is a block diagram illustrating an embodiment comprising training a DMTG generator using noise as an initialization.

FIG. 7 is a block diagram illustrating an embodiment comprising training a DMTG generator using noise as an initialization. The DMTG 707 includes a generator 709, which is composed of a GAN 711 comprising a discriminator neural network 713 and a generative neural network 715. Given a relatively sparse set of training images 701 as input into the discriminator neural network 713 and Gaussian noise 705 and defined by the mathematical equation 703 as input into the generative neural network 715, the two networks in the GAN 711 work together to train the generator neural network 715 to produce images that are representative of the training examples 701 used to train the discriminative network 713. The discriminative neural network 713 is aware of the original training images 701. The generative neural network 715 is not given data to begin with; instead it is initialized with Gaussian noise 705. The two networks play an adversarial game where the generator 715 generates images 717 that are then processed by the discriminator 713. The discriminator 713 classifies the generated images 717 as either similar to the training data set 701 or not. The generator 715 may use this information to learn how to generate new images 717 that are better than the last iteration of generated images. The output from the discriminator 713, may be used directly in the loss function for the generator 715. The loss function changes how the generator 715 will generate the next set of images. Once trained, DMTG 707 can be called upon to produce generated images. The output is a comparatively dense set of generated images 717.

Figure 8:
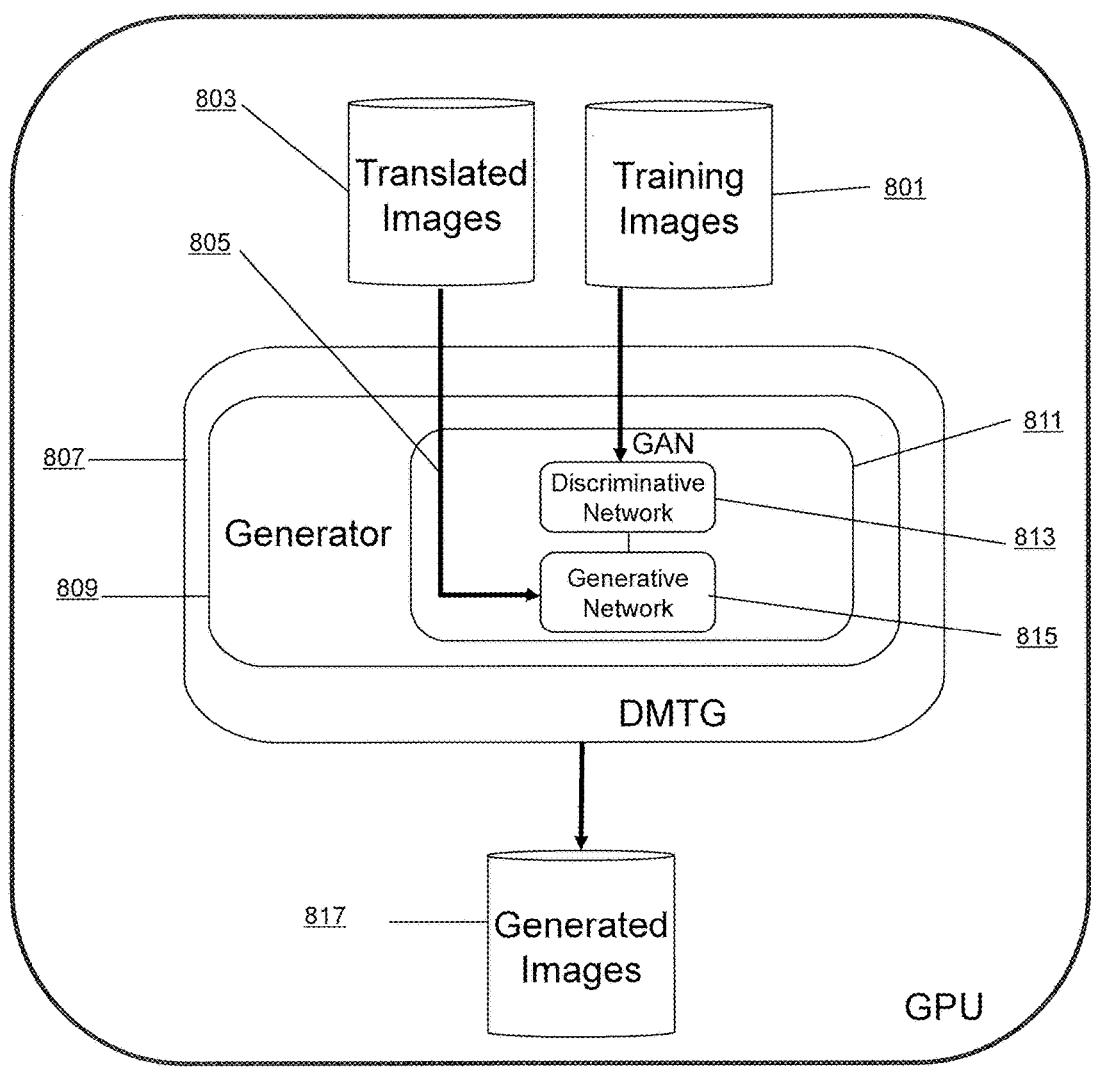
FIG. 8 is a block diagram illustrating an embodiment comprising training a DMTG generator using translated images as an initialization.

FIG. 8 is a block diagram illustrating an embodiment comprising training a DMTG generator using translated images as an initialization. The DMTG 807 includes a generator 809, which is composed of a GAN 811 comprising a discriminator neural network 813 and a generative neural network 815. Given a relatively sparse set of training images 801 as input into the discriminator network 813 and translated images 803 as input into the generative network 815 (note this input 805 is different than Gaussian noise), these two networks in the GAN 811 work together to train the generator neural network 815 to produce images that are representative of the training examples 801 used to train the discriminative network 813. The discriminative neural network 813 is aware of the original training images 801. The generative neural network 815 is not given data to begin with; instead it is initialized with translated images 803. The two networks play an adversarial game where the generator 815 generates images 817 that are then processed by the discriminator 813. The discriminator 813 then classifies the generated images 817 as either similar to the training data set 801 or not. The generator 815 may use this information to learn how to generate new images 817 that are better than the last iteration of generated images. The output from the discriminator 813, may be used directly in the loss function for the generator 815. The loss function changes how the generator 815 will generate the next set of images. Once trained, DMTG 807 can be called upon to produce generated images. The output is a comparatively dense set of generated images 817.

Figure 9:
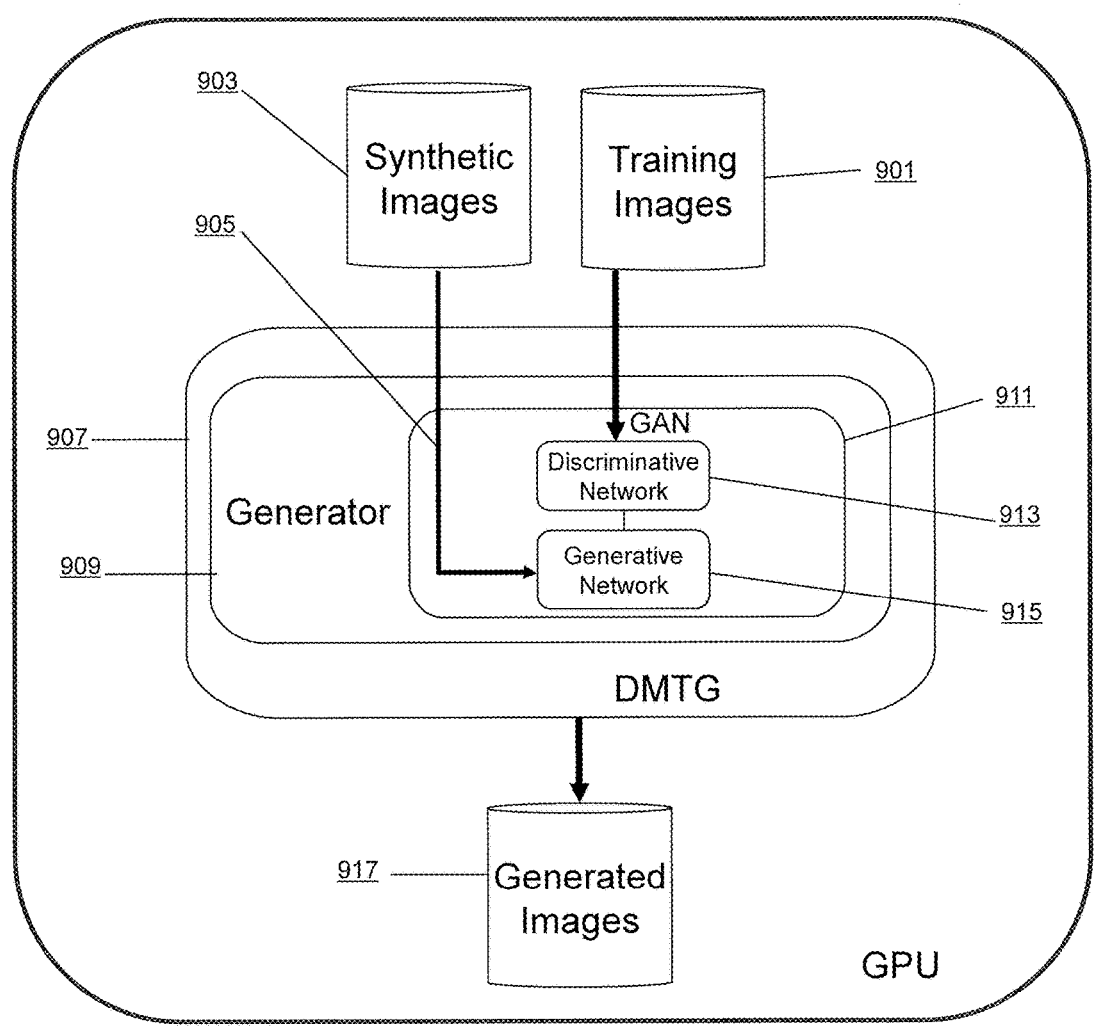
FIG. 9 is a block diagram illustrating an embodiment comprising training a DMTG generator using synthetic images as an initialization.

FIG. 9 is a block diagram illustrating an embodiment comprising training a DMTG generator using synthetic images as an initialization. The DMTG 907 includes a generator 909, which is composed of a GAN 911 comprising a discriminator neural network 913 and a generative neural network 915. Given a relatively sparse set of training images 901 as input into the discriminator network 913 and set of separately created synthetic images 903 as input into the generative network 915 (note this input 905 is different than Gaussian noise), these two networks work together to train the generator network 915 to produce images that are representative of the training examples 901 used to train the discriminative network 913. The discriminative neural network 913 is aware of the original training images 901. The generative neural network 915 is not given data to begin with; instead it is initialized with synthetic images 903. The two networks play an adversarial game where the generator 915 generates images 917 that are then processed by the discriminator 913. The discriminator 913 classifies the generated images 917 as either similar to the training data set 901 or not. The generator 915 may use this information to learn how to generate new images 917 that are better than the last iteration of generated images. The output from the discriminator 913, may be used directly in the loss function for the generator 915. The loss function changes how the generator 915 will generate the next set of images. Once trained, DMTG 907 can be called upon to produce generated images. The output is a comparatively dense set of generated images 917.

Deep Model Image Translation with Activations

Figure 10:
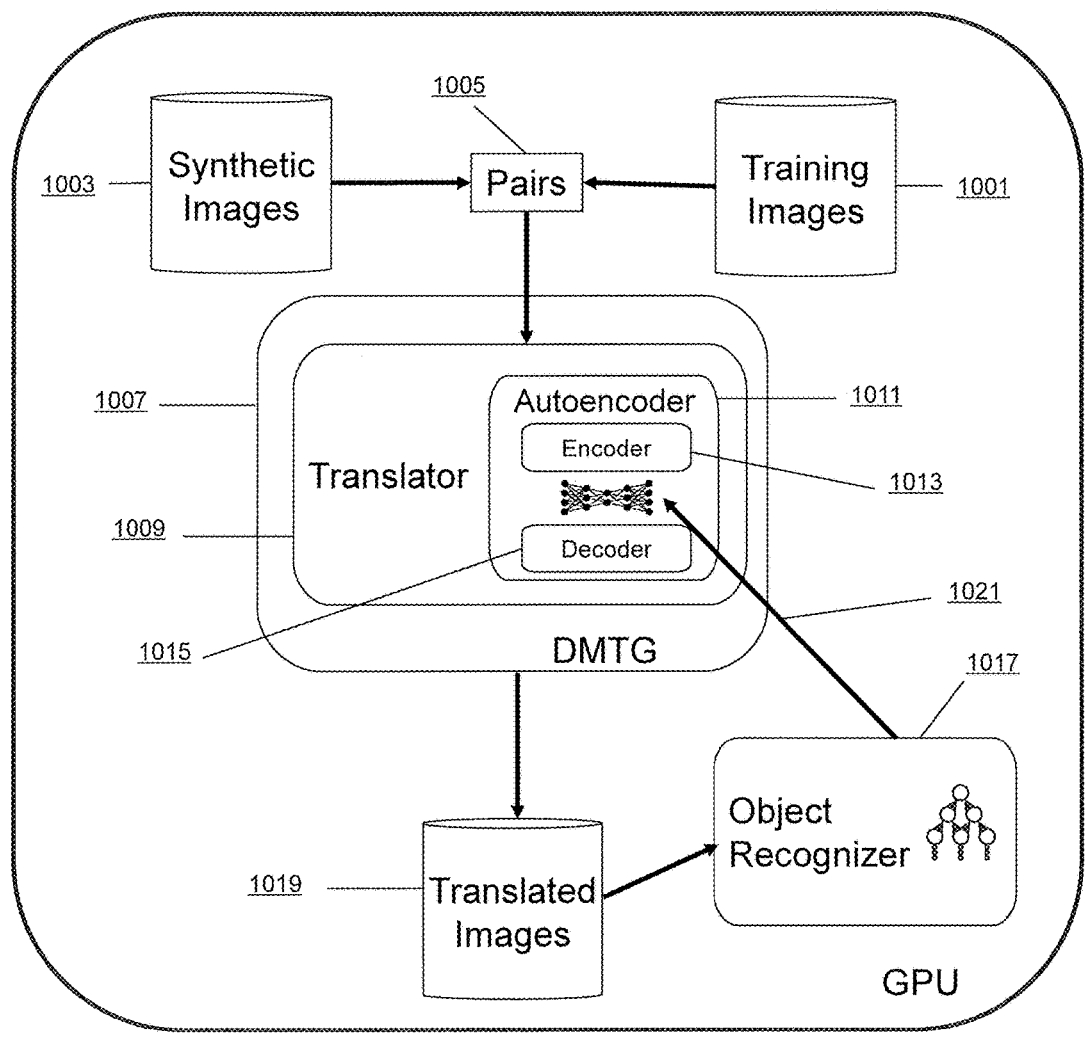
FIG. 10 is a block diagram illustrating an embodiment comprising training a DMTG translator using activations from an object recognizer.

FIG. 10 is a block diagram illustrating an embodiment comprising training a DMTG translator using activations from an object recognizer. Given a relatively sparse set of training images 1001 and a set of separately created synthetic images 1003, image pairs (or pairings) 1005 indicate which synthetic images 1003 align with which training images 1001. The pairs 1005 are the input to a translator 1009, which is a component of DMTG 1007. The translator 1009 comprises an autoencoder 1011, which consists of an encoder 1013 and decoder 1015. The encoder 1013 compresses training image data whereby N dimensions are mapped to M dimensions and M<N. The decoder 1015 uncompresses the data, mapping the M dimensions to N dimensions using a multi-layered convolutional neural network. Each time an image from synthetic images 1003 goes through encoder 1013 and decoder 1015, the network within the autoencoder 1011 learns how to take the compressed information based on 1003 to generate the image from 1001 based on pairing 1005. The output of the translator 1009 is a comparatively dense set of translated images 1019. As the object recognizer 1017 trains its own deep network, activations 1021 (the internal representation of the input) from the object recognizer 1017 are fed back into the autoencoder 1011 and used to further optimize the autoencoder.

Using Translation and Generation to Improve Object Recognition

Figure 26:
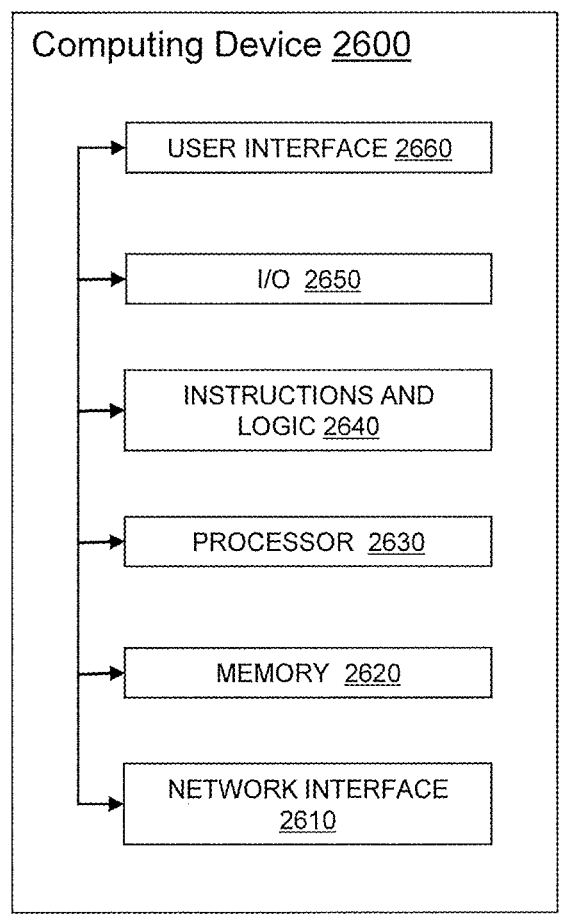
FIG. 26 is a block diagram of an exemplary embodiment of a Computing Device in accordance with the present invention.

FIG. 11 is a block diagram of an embodiment illustrating the process of recognizing objects using an object recognizer 1105 executing on a computing device 1111 such as Computing Device 2600 (see FIG. 26). Given a new image 1103 obtained from an optional external image sensor 1101, where the new image 1103 comprises an object 1109 (for example, the cat shown on the right side of image 1103), object recognizer 1105, once trained with a sufficiently dense set of training images 1102, will be able to recognize object 1109 in the image 1103 and produce an object label 1107 corresponding to the class of the object 1109 (for example, in FIG. 11, the class could be "cat"). Training images 1102 could comprise translated images 617, generated images 717, generated images 817, generated images 917, translated images 1019, translated images 1217, training images 1213, generated images 1317, training images 1313, translated images 1427, generated images 1425, training images 1423, training images 2147, training images 2249, translated images 2317, and/or translated images 2427. Object recognizer 1105 could be the same object recognizer as object recognizer 103, object recognizer 203, object recognizer 303, object recognizer 415, object recognizer 415, object recognizer 515, object recognizer 1017, object recognizer 1105, object recognizer 1219, object recognizer 1319, or object recognizer 1429.

FIG. 12 is a block diagram of an embodiment illustrating the process of training an object recognizer using translated images in addition to training images. During training of the object recognizer 1219, a relatively sparse set of training images 1213, and a relatively dense set of translated images 1215 are used. The translated images 1215 are produced by the DMTG 1203, and specifically the translator 1205 after it has been trained according to methods described herein. The translator 1205 includes an autoencoder 1207, which may contain an encoder 1209 and a decoder 1211. The encoder 1209 compresses the data whereby N dimensions are mapped to M dimensions and M<N. The decoder 1211 uncompresses the data mapping the M dimensions to N dimensions using a multi-layered convolutional neural network. The translator may be used to populate a relatively dense database of translated images 1215.

Figure 13:
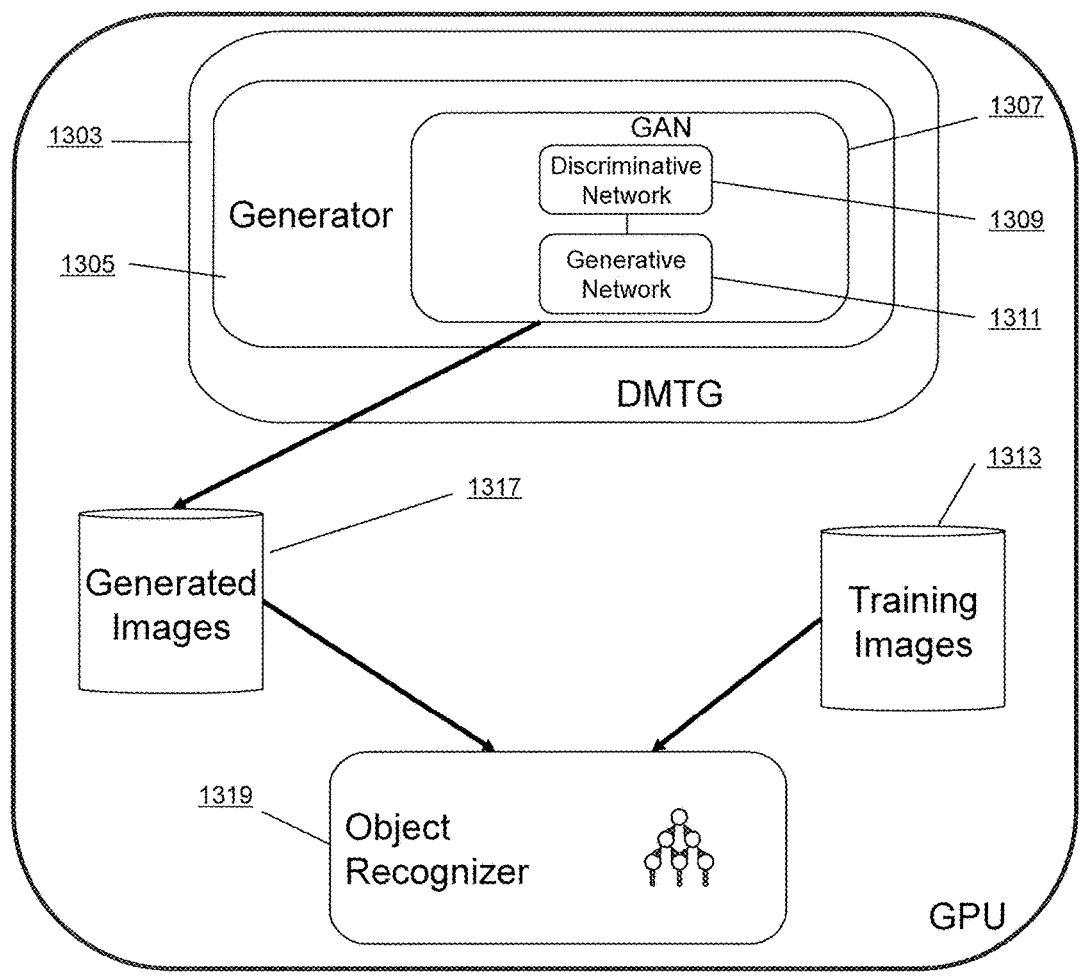
FIG. 13 is a block diagram of an embodiment illustrating the process of training an object recognizer using generated images in addition to training images.

FIG. 13 is a block diagram of an embodiment illustrating the process of training an object recognizer using generated images in addition to training images. During training of the object recognizer 1319, a relatively sparse set of training images 1313 and a relatively dense set of generated images 1317 are used. The generated images 1317 are produced by the DMTG 1303, and specifically the generator 1305 after it has been trained according to methods described herein. The generator may contain a generative adversarial network (GAN) 1307, which may contain a discriminative network 1309 and a generative network 1311. The generator 1311 may be used to populate a relatively dense database of generated images 1317.

Figure 14:
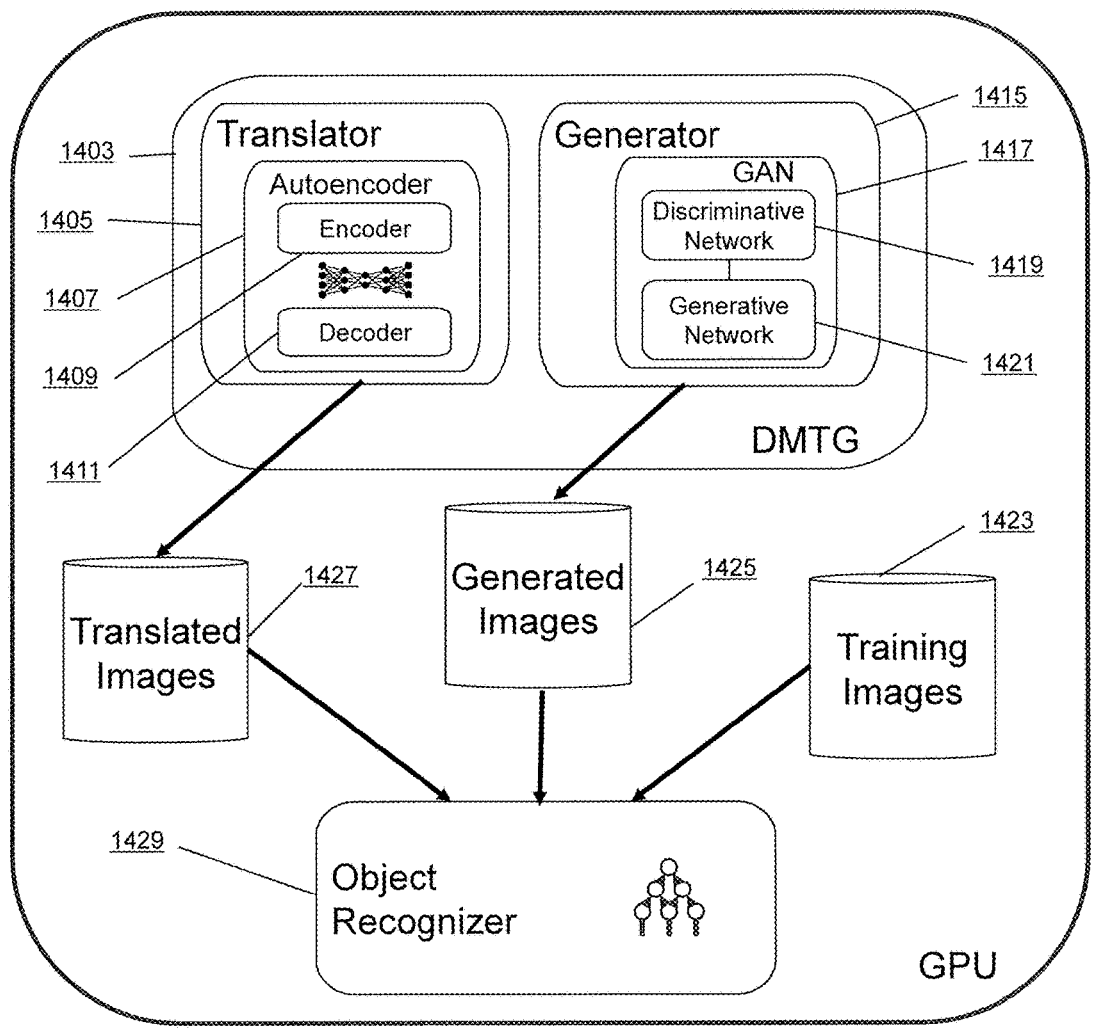
FIG. 14 is a block diagram of an embodiment illustrating the process of training an object recognizer using translated images and generated images in addition to training images.

FIG. 14 is a block diagram of an embodiment illustrating the process of training an object recognizer using translated images and generated images in addition to training images, according to an embodiment of the invention. During training of the object recognizer 1429, a relatively sparse set of training images 1421, a relatively dense set of translated images 1425 and a relatively dense set of generated images 1423, are used. The translated 1425 and generated 1423 images are produced by DMTG 1403 after its translator 1405 and generator 1415 have been trained according to methods described herein. The translator 1405 may produce translated images 1425, and the generator 1415 may produce generated images 1425. The translator 1405 may contain an autoencoder 1407, which may contain an encoder 1409 and a decoder 1411. The translator may be used to populate a relatively dense set of database of translated images 1425. The generator 1415 may contain a generative adversarial network (GAN) 1417 which may contain a discriminative network 1419 and a generative network 1421. The generator network 1421 may use this information to learn how to generate new images 1425 that are better than the last iteration of generated images. The generator 1415 may be used to populate a relatively dense database of generated images 1425.

FIG. 15 illustrates an example result of a translation process 1503 from a synthetic image of a cat 1501 to a photo realistic image of a cat 1505, according to an embodiment of the invention. Translation process 1503 may be performed by a translator such as translator 609 (see FIG. 6).

FIG. 16 illustrates an example translation process where a set of images 1601 on one manifold are translated by translation process 1603 into a set of images 1605 that exist on a different manifold, according to an embodiment of the invention. In this case a set of cats with frontal views 1601 are translated 1603 into images of cats with open mouths 1605. Again, translation process 1603 may be performed by a translator such as translator 609 (see FIG. 6).

Figure 17:
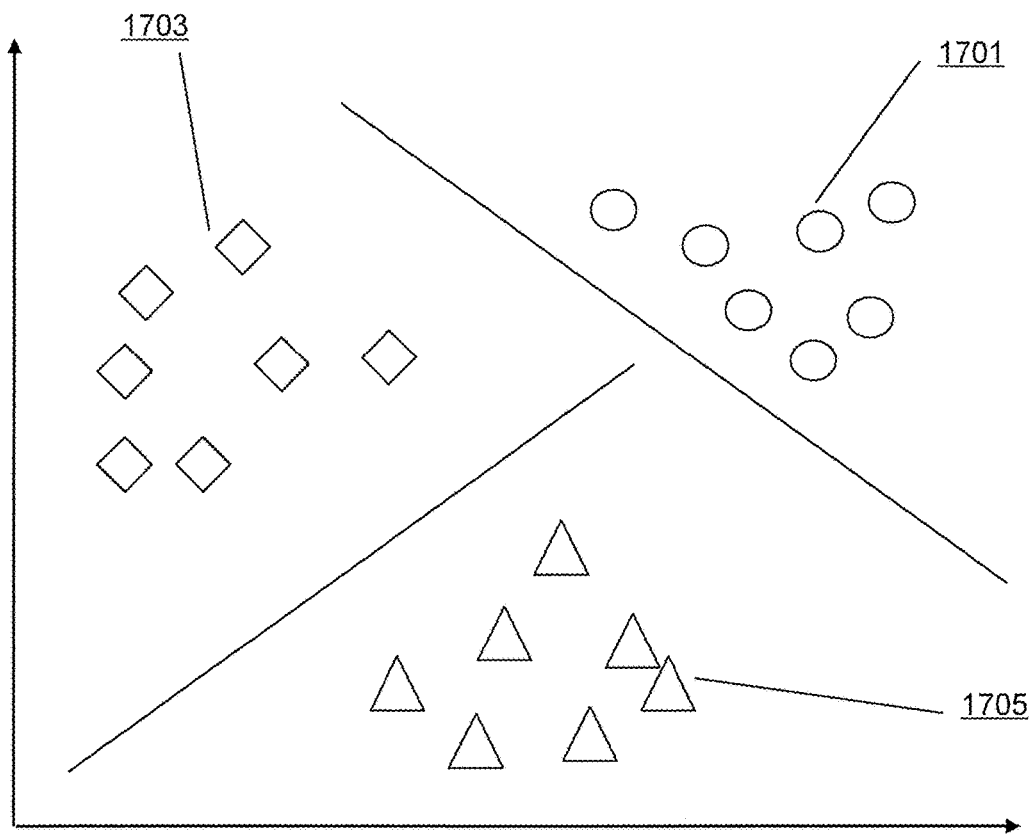
FIG. 17 illustrates linear separable objects in a space, where the objects have been grouped into three different classes.

FIG. 17 illustrates linear separable objects in a space, where the objects have been grouped into three different classes 1701, 1703, and 1705. Class 1703 comprises rectangles. Class 1701 comprises ellipses. Class 1705 comprises triangles. Because classes 1701, 1703 and 1705 in FIG. 17 can be separated from each other by straight lines, these classes are linear separable.

Figure 18:
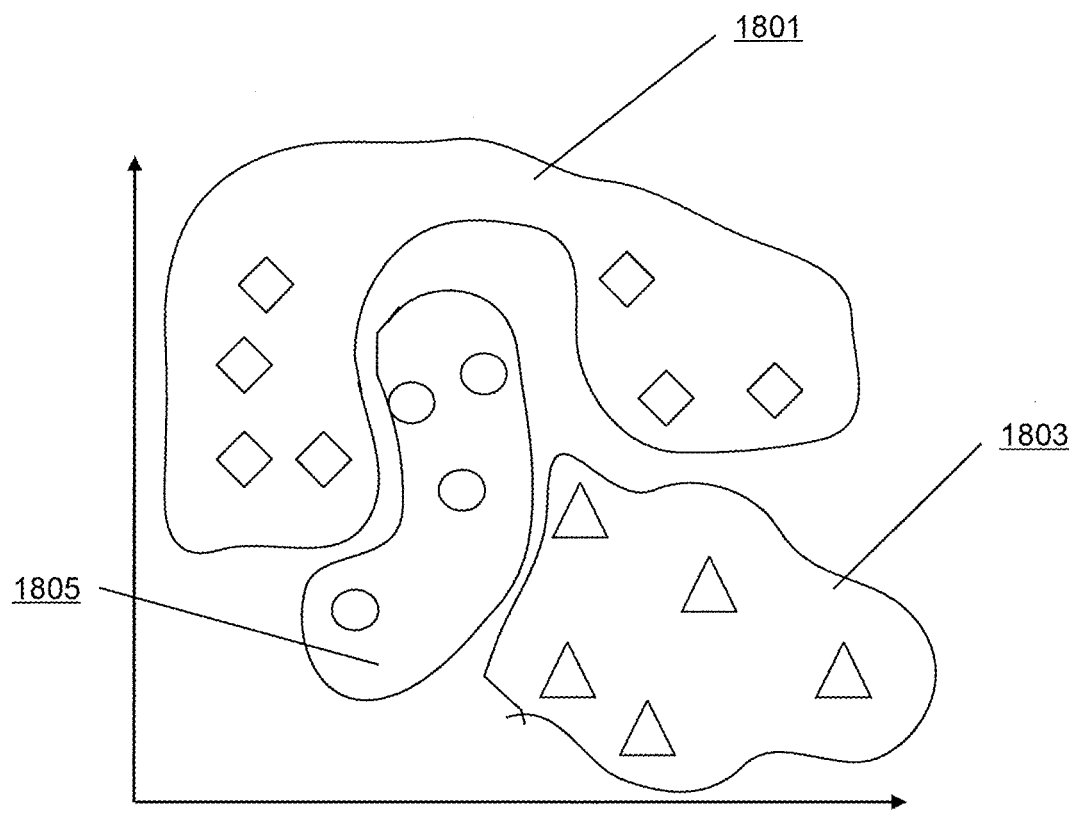
FIG. 18 illustrates linear inseparable objects in a space, where the objects have been grouped into three different classes.

FIG. 18 illustrates linear inseparable objects in a space, where the objects have been grouped into three different classes 1801, 1803, and 1805. Class 1801 comprises rectangles. Class 1805 comprises ellipses. Class 1803 comprises triangles. Because classes 1801, 1803, and 1805 in FIG. 18 cannot be separated from each other by straight lines, these classes are not linear separable.

FIG. 19 illustrates a translation process where one domain of images 1901 is translated into another domain of images 1917, according to an embodiment of the invention. Assuming an already trained translator exists, such as the translator 609 in FIG. 6, and assuming a set of training images 601 and a set of synthetic images 603, with image pairs 605 indicating which synthetic images 603 align with which training images 601, the pairings 605 are the input into the translator 609 within DMTG 607. The translator 609 consists of an autoencoder 611, which consists of an encoder 613 and decoder 615. The encoder 613 compresses the data whereby N dimensions are mapped to M dimensions and M<N. The decoder 615 uncompresses the data mapping the M dimensions to N dimensions using a multi-layered convolutional neural network. Each time an image from 603 goes through the encoder 613 and decoder 615, the network within autoencoder 611 learns how to take the compressed information based on synthetic images 603 to generate a corresponding image from 601 based on pairing 605. Now referring to FIG. 19, in domain 1901 there are three different classes of objects: 1903, 1905, and 1907. Class 1903 comprises rectangles. Class 1905 comprises triangles. Class 1907 comprises ellipses. In domain 1917 there are three different classes of objects: 1919, 1921, and 1923. Class 1919 comprises rectangles. Class 1923 comprises triangles. Class 1921 comprises ellipses. Using a trained translator such as translator 609, image 1909 of class 1905 is encoded into a hidden representation h 1913, then decoded into an image 1915 that is similar to the images in class 1923. As image 1909 goes through the translation process 1911, the image 1909 is encoded and reduced to a lower dimension by the encoder 613, which is represented by a hidden representation 1913, and then the image is decoded by the decoder 615 to produce the image 1915. For each image in 1901, a translation 1911 will proceed that will convert the images from domain 1901 to images that are similar to images in domain 1917. For example, images from class 1907 (ellipses) will be converted to images similar to 1921 (ellipses). Images from 1903 (rectangles) will be converted to images similar to 1919 (rectangles). Images from 1905 (triangles) will be converted to images similar to 1923 (triangles).

Figure 20:
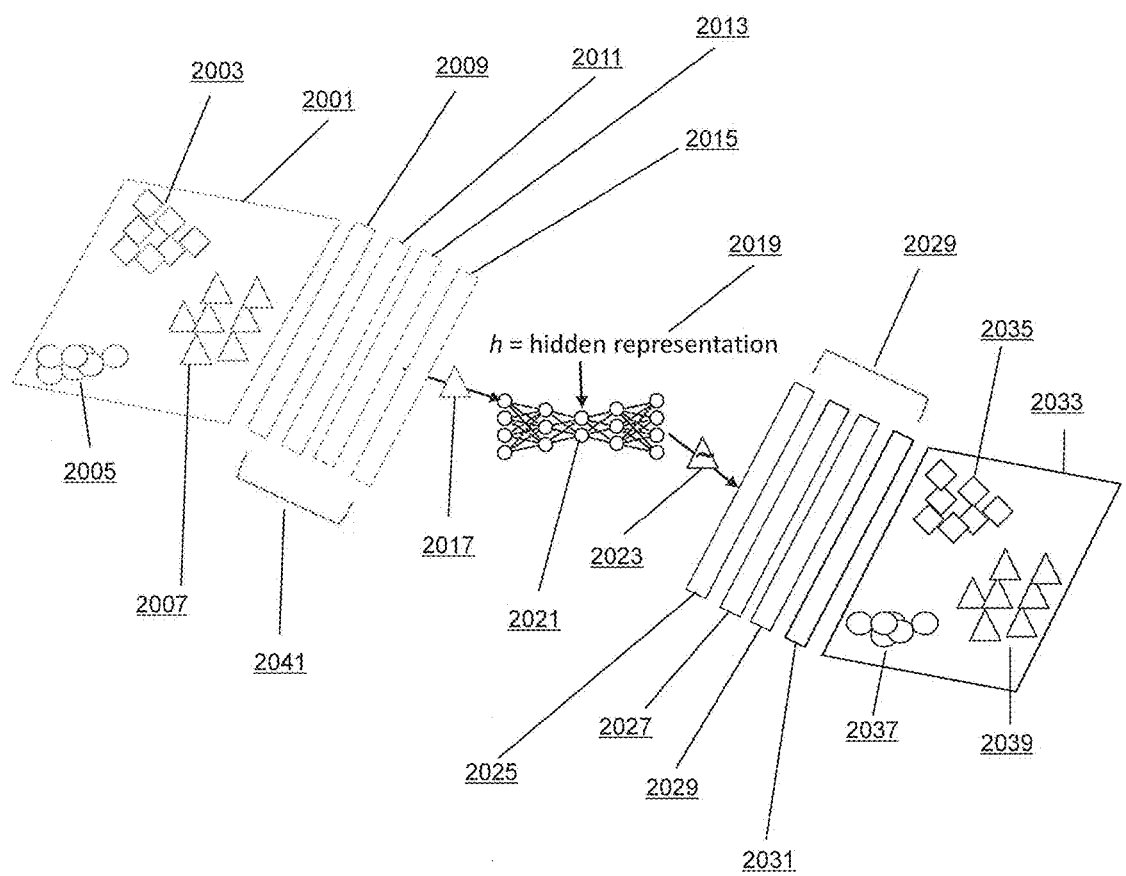
FIG. 20 illustrates a translation process where one domain of images is translated into another domain of images, according to an embodiment of the invention.

FIG. 20 illustrates the translation process where one domain of images 2001 is translated into another domain of images 2033, according to an embodiment of the invention. In domain 2001 there are three different classes of objects: 2003, 2005, and 2007. Class 2003 comprises rectangles. Class 2007 comprises triangles. Class 2005 comprises ellipses. In domain 2033 there are also three different classes of objects: 2035, 2037, and 2039. Class 2035 comprises rectangles. Class 2039 comprises triangles. Class 2037 comprises ellipses. Assuming an already trained translator, such as translator 609 as described in FIG. 6, a particular image 2017 of class 2017 is translated into an image 2023 that is similar to the images in class 2039. As image 2017 goes through the translation process 2021, the image is encoded by an encoder, such as encoder 613, and reduced to a lower dimension which is represented by a hidden representation 2019 and then decoded by a decoder, such as decoder 615, to produce the image 2023. In this diagram, additional transformations can be applied globally 2041 for all images in domain 2001 before going through the translation process, represented by four different global transformations 2009, 2011, 2013, and 2015. In addition, global transformations 2029, in this diagram four different global transformations 2025, 2027, 2029, and 2031 are applied to all images after the translation process. These two types of global transformations—either occurring before transformation 2041 where the global information becomes part of what is learned by the network, or after 2029 where the network does not learn the global information—are used in addition to the translation process to allow for different transformations. For each image in 2001, a translation 2021 will proceed that will convert the images from domain 2001 to images similar to images in domain 2033. For example, images from class 2003 will be converted to images similar to class 2035. Images from class 2005 will be converted to images similar to class 2037. Images from class 2007 will be converted to images similar to class 2039.

Figure 21:
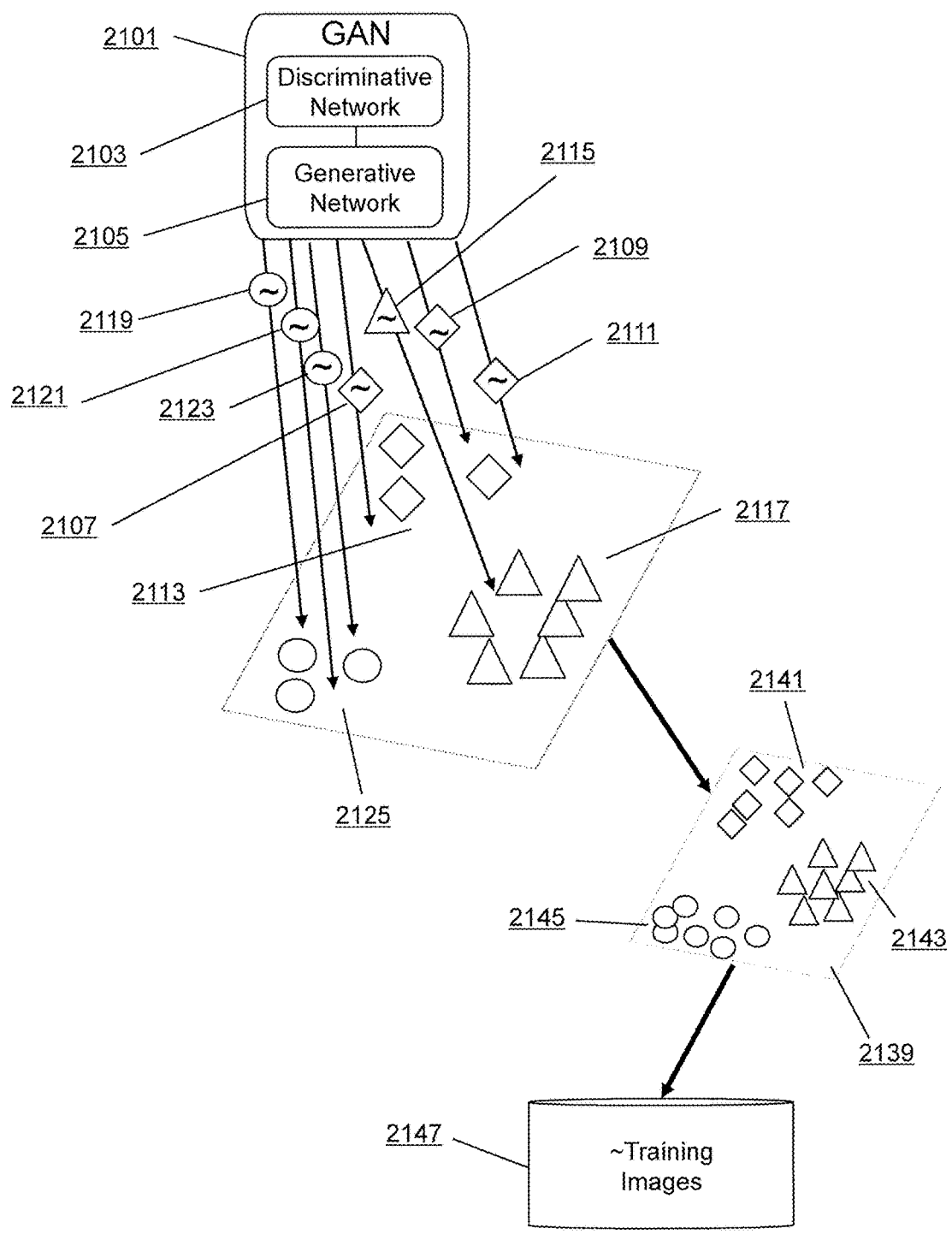
FIG. 21 illustrates an image generation process using a Generative Adversarial Network (GAN), according to an embodiment of the invention.

FIG. 21 illustrates the image generation process using a Generative Adversarial Network (GAN), according to an embodiment of the invention. In this figure, a single GAN 2101 may contain a discriminative network 2103 and a generative network 2015 to generate images for three different classes of images: 2113, 2117, and 2125. Class 2113 is represented as rectangles. Class 2117 is represented as triangles. Class 2125 is represented as ellipses. The GAN 2101 may be used generate images of each class. For example, three images, 2107, 2109, and 2111 are created for class 2113. One image, 2115, is created for class 2117. Three images, 2119, 2121, 2123, are created for class 2125. As is the case for class 2113 and class 2125, the GAN 2101 is able to fill in the sparsity for these two under-represented classes. The results of image generation using the GAN 2101 is shown by classes with additional images 2139. Class 2125 becomes class 2145. Class 2113 becomes class 2141. Class 2117 becomes class 2143. Images in classes 2143, 2144, and 2145 are all are stored in the image generation database 2147.

Figure 22:
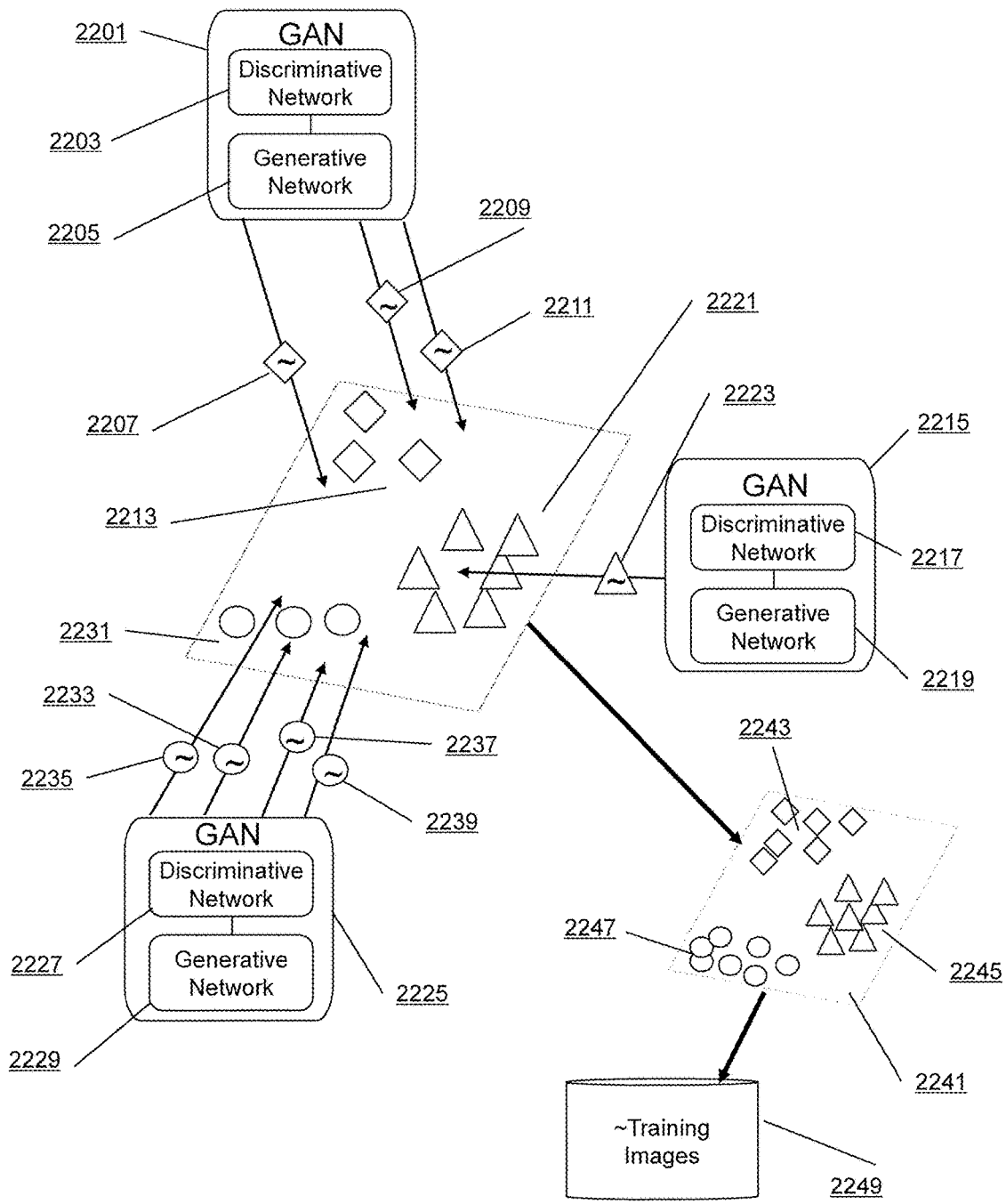
FIG. 22 is a block diagram illustrating the image generation process using multiple Generative Adversarial Networks (GANs), according to an embodiment of the invention.

FIG. 22 is a block diagram illustrating the image generation process using multiple Generative Adversarial Networks (GANs), according to an embodiment of the invention. In this diagram, a different GAN may be used to generate images for each class. A class 2213 represented as rectangles has assigned a GAN 2201 which may contain a Discriminative network 2203 and a Generative network 2205. The GAN 2201 generates new images 2207, 2209, and 2211, which are similar to corresponding images in class 2213. A class 2221 represented as triangles has assigned a GAN 2215 which may contain a Discriminative network 2217 and a Generative network 2219. The GAN 2215 generates a new image 2223, which is similar to corresponding images in class 2221. A class 2231 represented as ellipses has assigned a GAN 2225 which may contain a Discriminative network 2227 and a Generative network 2229. The GAN 2225 generates new images 2233, 2235, 2237, and 2239, which are similar to corresponding images in class 2231. The results of image generation using the GANs 2201, 2215, and 2225 are shown by classes with additional images 2241. Class 2213 becomes class 2243. Class 2221 becomes class 2245. Class 2231 becomes class 2247. Images in classes 2243, 2245, and 2247 are stored in the image generation database 2249.

Figure 23:
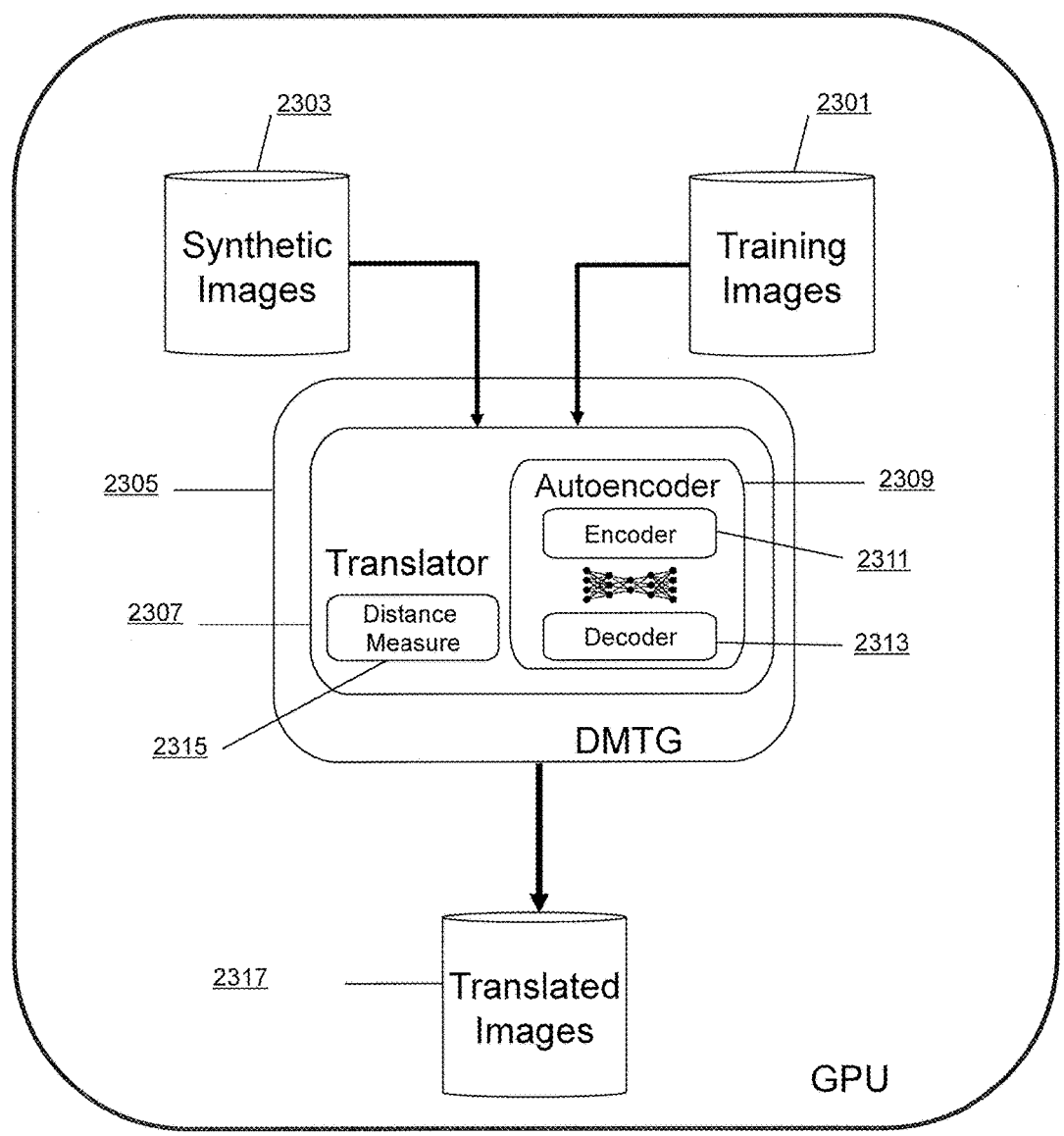
FIG. 23 is a block diagram illustrating a variation of training a translator that includes unpaired images, according to an embodiment of the invention.

FIG. 23 is a block diagram illustrating a variation of training a translator that includes unpaired images, according to an embodiment of the invention. In FIG. 6, a translator 609 was shown with pairs 605 of images from a synthetic database 603 and a training database 601. The pairs 605 are used to train the translator 609. In FIG. 23, the set of synthetic images 2303 and the relatively sparse set of training images 2301 are not paired. The translator 2307 which is part of DMTG 2305 may contain an autoencoder 2309 which may contain an encoder 2311 and a decoder 2313. The encoder 2311 compresses the data whereby N dimensions are mapped to M dimensions and M<N. The decoder 2313 uncompresses the data mapping the M dimensions to N dimensions using a multi-layered convolutional neural network. Each time an image from synthetic images 603 goes through the encoder 2311 and decoder 2313, the network within the autoencoder 2309 learns how to take the compressed information based on synthetic images 603 to generate a corresponding image from training images 601 based on the corresponding pairing 605. The translator 2307 may use an internal distance measure 2315 to find pairs automatically. Translated images are stored in a relatively dense database 2317.

Figure 24:
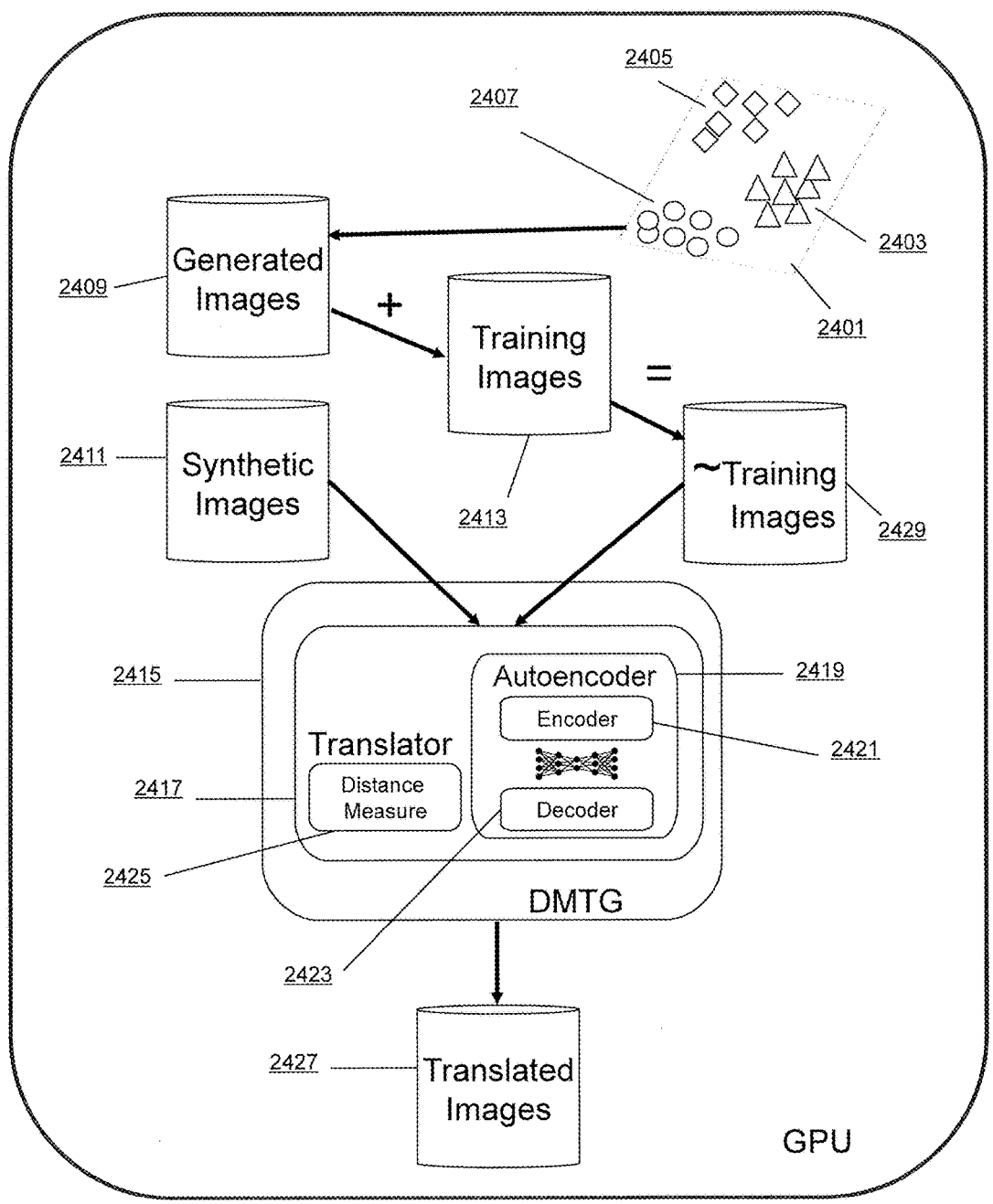
FIG. 24 shows an even further advancement by enriching the translation process with generated images, according to an embodiment of the invention.

FIG. 24 shows an even further advancement by enriching the translation process with generated images 2409. In FIG. 24, a GAN, such as GAN 2101, may be used to enrich a data set with generated images 2401. In 2401 one class 2405 of images is represented as rectangles, one class 2407 is represented as ellipses, and another class 2403 is represented as triangles. These images are stored in a generated image database 2409. The generated images 2409 are treated as training images in addition to the pre-existing relatively sparse set of training images 2413, whereby the combination of these two data sets forms a new training data set 2429. In addition, the generated images 2409 are used. DMTG 2415 may contain a translator 2417, which includes an autoencoder 2419 with an encoder 2421 and a decoder 2423. The encoder 2421 compresses the training images 2429 whereby N dimensions are mapped to M dimensions and M<N. The decoder 2423 uncompresses the data mapping the M dimensions to N dimensions using a multi-layered convolutional neural network. It also has the ability to internally pair synthetic images 2411 and training images 2413 automatically using a distance-based measure 2417 that discovers similar images. The output of the translator is a relatively dense set of translated images 2427.

FIG. 25 shows the effects of image generation on a data set 2501 having 3 classes of images. One class of images is represented as rectangles 2503. A second class of images is represented as ellipses 2505. A third class of images is represented as triangles 2507. Given a sparse class 2503, an image generator can be used to generate additional images similar to images that exist in that class. In FIG. 25, six images are 'generated' images (2509, 2511, 2513, 2515, 2517, 2519).

Sparse Data Sets Versus Dense Data Sets

Typically, a set of training images for a given object (or an object class), such as training images 101, 201, 301, 411, 511, 601, 701, 801, 901, 1001, 1102, 2301, and 2413, will comprise a relatively sparse set of real-world images obtained from actual photographs, as well as from other means of obtaining images of objects (for example, RADAR). As mentioned above, embodiments of the present invention relate to systems and methods for improving the training of machine learning systems to recognize certain objects within a given image, where the number of real-world training images is relatively sparse, but the number of synthetically derived training images is comparatively dense. In the context of the present invention, it is difficult to describe the precise boundaries of a "sparse" data set versus those of a "dense" data set. It is difficult because the ultimate goal of training a machine learning system to recognize a given object is not entirely dependent on the quantity of training data. The quality of training data is important as well, as is the variety of different perspectives and viewpoints of a given object represented in a training data set. For purposes of the present invention, however, a "sparse" data set is one that does not contain enough high-quality variations of an object to train a machine learning system to effectively recognize the object with acceptable reliability and/or confidence. A "dense" data set, on the other hand, is simply a data set that is not sparse. That is, a dense data set will contain enough high-quality variations of an object to train a machine learning system to effectively recognize the object with acceptable reliability and/or confidence. Embodiments of the present invention can transform sparse data sets into dense data sets by teaching machine learning systems to create additional high-quality training data using sparse data sets as a starting point, without the need to acquire more real-world images, which can often be a costly task that may also subject the image-gathering systems and/or personnel to unacceptable risk. Recognizing the problems associated with defining a precise set of quantities or limits that would characterize a sparse data set versus a dense data set, and putting aside the issue of image quality and other factors, for instructional purposes, the number of images in a sparse data set may often be in the range from tens of images to hundreds of images. The number of images in a dense data set, on the other hand, may range over one or two thousand images to many thousands of images.

Variations

As depicted in FIG. 5, where DMTG 501 may contain a generator 503 which is composed of a GAN 505 which has a discriminative neural network 507 and a generative neural network 509. The images generated 513 from the generator 503 can be used in conjunction with the training images 511 to train an object recognizer 515. This requires fewer images from the training image data set 511 while still achieving high accuracy rates 519 when measuring accuracy as a function of the number of original training examples 517. Again, this method is particularly suitable for methods which require very large amounts of data, such as deep learning neural networks (a subset of machine learning).

Given an image that exists in a data set, if that image were transformed either through rotation, lighting changes, or other sort of distortions, it would still similar to the set of images. Deep generative models take advantage of this and can be used to generate new images based on training a network from an existing data set. Deep model image generation may be used to supplement a sparse data set by generating additional images to 'fill-in' for missing data. This method can be guided by class labels but also works as an unsupervised approach.

As depicted in FIG. 7, DMTG 707 consists of a generator 709 which may contain a generative adversarial network (GAN) 711 which may contain two networks, a discriminative network 713 and a generative network 715. The generative network 715 is typically initialized with Gaussian noise 705 defined in a manner similar to equation 703. The discriminative network 713 is trained based on the set of training images. As the two networks play the adversarial game, over time they improve and eventually the generative network 715 is able to generate images 717 that statistically are similar to the training images 701.

A variation of the process depicted in FIG. 7 is shown in FIG. 8 where a generative adversarial network (GAN) can also be initialized with what it learned from the autoencoding method. As shown in FIG. 8, DMTG 807 consists of a generator 809 which may contain a generative adversarial network (GAN) 811 which may contain two networks, a discriminative network 813 and a generative network 815. The generative network 815 is initialized in this case with the output from a translation 803. The discriminative network 813 is trained based on the set of training images. As the two networks play the adversarial game, over time they improve and eventually the generative network 815 is able to generate images 817 that statistically are similar to the training images 801. By initializing with the translation images 803, the generative network 815 is able to learn how to produce images similar to the training data 801 faster.

Another variation of the process depicted in FIG. 7 is shown in FIG. 9 where a generative adversarial network (GAN) can also be initialized with what it learned from the autoencoding method. As shown in FIG. 9, DMTG 907 consists of a generator 909 which may contain a generative adversarial network (GAN) 911 which may contain two networks, a discriminative network 913 and a generative network 915. The generative network 915 is initialized in this case with the synthetic images 903 (Note, synthetic images 603 as depicted in FIG. 6 are used with training images 601 to train the translator 609). The discriminative network 913 is trained based on the set of training images. As the two networks play the adversarial game, over time they improve and eventually the generative network 915 is able to generate images 917 that statistically are similar to the training images 901. By initializing with the synthetic images 903, the generative network 915 is able to learn how to produce images similar to the training data 901 faster.

To improve object recognition with fewer training examples, as depicted in FIG. 13, the trained DMTG 1303 Generator 1305 can be used to generate images. Where the Generator 1305 may contain a GAN 1307 which consists of two networks, a discriminative network 1309 and a generative network 1311. After the Generator 1305 has been trained, it can then be called upon to generate N samples given an input image resulting in a set of generated images 1317. The Object Recognizer 1319 can be trained using the generated images 1317 in conjunction with the training images 1313.

As mentioned, embodiments of the DMTG can be used to 'fill-in' sparse data sets. In FIG. 21, the act of 'filling-in' images for sparse classes in shown. Assuming a single GAN 2101 which may contain a Discriminative network 2103 and a Generative network 2015, the GAN can generate images for three different classes of image 2113, 2117, and 2125. For example, the class with rectangles 2113 has only three samples in this example. The GAN 2101 can be called upon to generator more examples such as 2107, 2109 and 2111. The new data set 2139 that includes both the original images and the generated images form a new training data set 2147.

A variation of FIG. 21 assumes a GAN is created for each class type, depicted in FIG. 22. A class 2213 represented as rectangles has assigned a GAN 2201 which may contain a Discriminative network 2203 and a Generative network 2205. A class 2221 represented as triangles has assigned a GAN 2215 which may contain a Discriminative network 2217 and a Generative network 2219. A class 2231 represented as ellipses has assigned a GAN 2225 which may contain a Discriminative network 2227 and a Generative network 2229. The GAN 2201 can be called upon to generator more examples such as 2207, 2209 and 2211. The new data set 2241 that includes both the original images and the generated images form a new training data set 2249.

In addition to the aforementioned benefits, deep image translation and deep image generation can be used together to improve object recognition. In FIG. 14 the output from the Translator 1405 in the form of translated images 1427 in addition to the output from the Generator 1415 in the form of generated images 1425 can be used along with the training images 1423 to train the Object Recognizer 1429.

Furthermore, a feedback mechanism between the Deep Model Image Generation and Deep Model Image Translation processes is depicted by FIG. 24. In FIG. 24 assuming a generated data set 2409 was produced. The generated data set 2409 can be combined with the training images 2413 and used with the synthetic images 2411 to train the Translator 2417. The translator 2417 using its internal distance measures 2425 would apply automatic pairing in order to use the autoencoder 2419 to encode the synthetic images 2411 to be similar to the training images 2429 that were formed by combining the generated images 2411 with the training images 2413.

When an autoencoder learns an encoding from one image domain to another, that encoding can then be applied to other images. This method tends to preserve spatial relationships between the other data points in the data set, which often has benefits in training (scale, translation and rotational invariance are known to improve the performance of many machine learning methods in related computer vision tasks). In particular, when performing this type of embedding using deep architectures, manifold shapes across domains are preserved. In FIG. 16, for example, the frontal cat face "manifold" is "translated" to the open mouth face cat "manifold," where certain properties are preserved across the manifold, such as the darkness and spatial arrangements of some markings on the cats. This concept tends to hold in language-based translations as shown in Natural Language Processing machine translation research [see endnote 2]. This method enables class-to-class translations as well as cross-domain translations. For instance, it is possible that translations of black cats to black cats has special properties that do not hold for translations of tabby cats to tabby cats.

A key component of this work is pairing images between domains, where image pairing is established a priori by domain experts. As depicted in FIG. 23, a translator 2307 has the ability to perform automatic pairing by using a set of distance based measures 2315. Given a set of images from domain one 2303 and a set of images from domain two 2301, whereby domain one represents synthetic images 2303 and domain two represents the original training images 2301, DMTG 2305 and in particular the translator 2307 which may contain an autoencoder 2309 is able to approximate pairs using two different techniques, mean squared error and structural similarity measures. Using a function that combines these methods 2307, DMTG 2305 is able to find approximate pairs between domain one 2303 and domain two 2301.

When using a distance-based metric, careful attention should be made to ensure at each iteration in the training process, that a random match is chosen to pair. This forces the autoencoder to learn more variations for a particular input.

A further modification to the Deep Model Image Translation embodiment, as shown in FIG. 10, relates to the loss function, which controls how the autoencoder 1011 improves its learning process over time. Normally, at each iteration a loss function may be used to calculate how well the network performed on the iteration of training. The results of this function dictate how the network will change on the next iteration. Normally, the loss is calculated internally by the translator 1009. However, in this variation, the activations 1021 which are retrieved from the object recognizer 1017, which is also a deep neural network, are used inside of the loss function of the autoencoder 1011. This coordination between the object recognizer 1017 and the translator 1009 synchronizes how well the object recognizer performs with how the autoencoder changes its translation process.

Benefits of the Embodiments

The embodiments described benefit the object recognition task by reducing the requirement to acquire large data sets in order to train an object recognition algorithm. This is of particular importance to deep learning object recognition algorithms, as typically deep learning neural networks require large data sets to sufficiently train the network. As data acquisition can be a costly expense the embodiments described in this invention can significantly reduce those costs.

Specifically, the Deep Model Image Translation embodiment describes how to translate from one set of images to another set of images. The benefit of this embodiment enables one to use existing data collects, adapt images in those data collects to images required to train the object recognizer. In addition, this method can be applied to adapt classes within a data set to other classes in that data set, addressing the issue of unbalanced data sets, poor quality images and sparsity.

The embodiment described as Deep Model Image Generation describes a method by which a significantly smaller data set can be used to train an object recognizer. The Deep Model Image Generation embodiment can generate 10 s of 1000 s of images for each image in a given data set. This can result in a significant cost savings in both data acquisition and data cleaning efforts to prepare new data collects to be used to train an object recognizer.

This embodiment also addresses the issue of sparsity and non-existent classes by filling in data sets where there are otherwise very few images. Using the existing data collects, this embodiment describes a method for generating new images that are closely related to the images contained in the existing data set.

Additional benefits include using the embodiments together to overcome common issues among machine learning data sets such as sparsity, noise, obfuscation of objects, poor quality images, and non-existent images.

In addition, described is how the embodiments can work with each other to further improve the methods put forth. First, by initializing the generation process with output from the translation process to speed-up image generation. Second, to improve the translation process successful rounds of image generation can be used with training data sets as input into the translation training process.

Computing Device

FIG. 26 is a block diagram of an exemplary embodiment of a Computing Device 2600 in accordance with the present invention, which in certain operative embodiments can comprise, for example, Object Recognizer (103, 203, 303, 415, 415, 515, 1017, 1105, 1219, 1319, 1429), DMTG (401, 501, 607, 707, 807, 907, 1007, 1203, 1303, 1403, 2305, 2415), Autoencoder (405, 611, 1011, 1207, 1407, 2309, 2419), Translator (403, 609, 1009, 1205, 1405, 2307, 2417), Generator (503, 709, 809, 909, 1305, 1415), GAN (505, 711, 811, 911, 1307, 1417, 2101, 2201, 2215, 2225). Computing Device 2600 can comprise any of numerous components, such as for example, one or more Network Interfaces 2610, one or more Memories 2620, one or more Processors 2630, program Instructions and Logic 2640, one or more Input/Output ("I/O") Devices 2650, and one or more User Interfaces 2660 that may be coupled to the I/O Device(s) 2650, etc.

Computing Device 2600 may comprise any device known in the art that is capable of processing data and/or information, such as any general purpose and/or special purpose computer, including as a personal computer, workstation, server, minicomputer, mainframe, supercomputer, computer terminal, laptop, tablet computer (such as an iPad), wearable computer, mobile terminal, Bluetooth device, communicator, smart phone (such as an iPhone, Android device, or BlackBerry), a programmed microprocessor or microcontroller and/or peripheral integrated circuit elements, a high speed graphics processing unit, an ASIC or other integrated circuit, a hardware electronic logic circuit such as a discrete element circuit, and/or a programmable logic device such as a PLD, PLA, FPGA, or PAL, or the like, etc. In general, any device on which a finite state machine resides that is capable of implementing at least a portion of the methods, structures, API, and/or interfaces described herein may comprise Computing Device 2600.

Memory 2620 can be any type of apparatus known in the art that is capable of storing analog or digital information, such as instructions and/or data. Examples include a non-volatile memory, volatile memory, Random Access Memory, RAM, Read Only Memory, ROM, flash memory, magnetic media, hard disk, solid state drive, floppy disk, magnetic tape, optical media, optical disk, compact disk, CD, digital versatile disk, DVD, and/or RAID array, etc. The memory device can be coupled to a processor and/or can store instructions adapted to be executed by processor, such as according to an embodiment disclosed herein. In certain embodiments, Memory 2620 may be augmented with an additional memory module, such as the HiTech Global Hybrid Memory Cube.

Input/Output (I/O) Device 2650 may comprise any sensory-oriented input and/or output device known in the art, such as an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, vibrator, tactile simulator, and/or tactile pad, optionally including a communications port for communication with other components in Computing Device 2600.

Instructions and Logic 2640 may comprise directions adapted to cause a machine, such as Computing Device 2600, to perform one or more particular activities, operations, or functions. The directions, which can sometimes comprise an entity called a "kernel", "operating system", "program", "application", "utility", "subroutine", "script", "macro", "file", "project", "module", "library", "class", "object", or "Application Programming Interface," etc., can be embodied as machine code, source code, object code, compiled code, assembled code, interpretable code, and/or executable code, etc., in hardware, firmware, and/or software. Instructions and Logic 2640 may reside in Processor 2630 and/or Memory 2620.

Network Interface 2610 may comprise any device, system, or subsystem capable of coupling an information device to a network. For example, Network Interface 2610 can comprise a telephone, cellular phone, cellular modem, telephone data modem, fax modem, wireless transceiver, Ethernet circuit, cable modem, digital subscriber line interface, bridge, hub, router, or other similar device.

Processor 2630 may comprise a device and/or set of machine-readable instructions for performing one or more predetermined tasks. A processor can comprise any one or a combination of hardware, firmware, and/or software. A processor can utilize mechanical, pneumatic, hydraulic, electrical, magnetic, optical, informational, chemical, and/or biological principles, signals, and/or inputs to perform the task(s). In certain embodiments, a processor can act upon information by manipulating, analyzing, modifying, converting, transmitting the information for use by an executable procedure and/or an information device, and/or routing the information to an output device. Processor 2630 can function as a central processing unit, local controller, remote controller, parallel controller, and/or distributed controller, etc.

Processor 2630 can comprise a general-purpose computing device, including a microcontroller and/or a microprocessor. In certain embodiments, the processor can be dedicated purpose device, such as an Application Specific Integrated Circuit (ASIC), a high-speed Graphics Processing Unit (GPU) or a Field Programmable Gate Array (FPGA) that has been designed to implement in its hardware and/or firmware at least a part of an embodiment disclosed herein. In certain embodiments, Processor 2630 can be a Tegra X1 processor from NVIDIA. In other embodiments, Processor 2630 can be a Jetson TX1 processor from NVIDIA, optionally operating with a ConnectTech Astro Carrier and Breakout board, or competing consumer product (such as a Rudi (PN ESG503) or Rosie (PN ESG501) or similar device). In another embodiment, the SFF device 750 is the Xilinx proFPGA Zync 7000 XC7Z100 FPGA Module. In yet another embodiment, Processor 2630 can be a HiTech Global Kintex Ultrascale-115. In still another embodiment, Processor 2630 can be a standard PC that may or may not include a GPU to execute an optimized deep embedding architecture.

User Interface 2660 may comprise any device and/or means for rendering information to a user and/or requesting information from the user. User Interface 2660 may include, for example, at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or another haptic device, etc. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, auto-sizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

The present invention can be realized in hardware, software, or a combination of hardware and software. The invention can be realized in a centralized fashion in one computer system, or in a distributed fashion where different elements are spread across several computer systems. Any kind of computer system or other apparatus adapted for carrying out the methods described herein is suitable. A typical combination of hardware and software can be a general-purpose computer system with a computer program that, when being loaded and executed, controls the computer system such that it carries out the methods described herein.

Although the present disclosure provides certain embodiments and applications, other embodiments apparent to those of ordinary skill in the art, including embodiments that do not provide all of the features and advantages set forth herein, are also within the scope of this disclosure.

The present invention, as already noted, can be embedded in a computer program product, such as a computer-readable storage medium or device which when loaded into a computer system is able to carry out the different methods described herein. "Computer program" in the present context means any expression, in any language, code or notation, of a set of instructions intended to cause a system having an information processing capability to perform a particular function either directly or indirectly after either or both of the following: a) conversion to another language, code or notation; or b) reproduction in a different material form.

The foregoing disclosure has been set forth merely to illustrate the invention and is not intended to be limiting. It will be appreciated that modifications, variations and additional embodiments are covered by the above teachings and within the purview of the appended claims without departing from the spirit and intended scope of the invention. Other logic may also be provided as part of the exemplary embodiments but are not included here so as not to obfuscate the present invention. Since modifications of the disclosed embodiments incorporating the spirit and substance of the invention may occur to persons skilled in the art, the invention should be construed to include everything within the scope of the appended claims and equivalents thereof.

REFERENCES

[1] Goodfellow, Ian, et al. "Generative adversarial nets." Advances in neural information processing systems. 2014. Goodfellow, Ian, et al. "Generative adversarial nets." Advances in neural information processing systems. 2014.
[2] Koehn, Philipp. Statistical machine translation. Cambridge University Press, 2009.
[3] Hinton, Geoffrey E., and Ruslan R. Salakhutdinov. "Reducing the dimensionality of data with neural networks." science 313.5786 (2006): 504-507.
[4] Hinton, Geoffrey E., Simon Osindero, and Yee-Whye Teh. "A fast learning algorithm for deep belief nets." Neural computation 18.7 (2006): 1527-1554.
[5] Radford, Alec, Luke Metz, and Soumith Chintala. "Unsupervised representation learning with deep convolutional generative adversarial networks." arXiv preprint arXiv:1511.06434 (2015).
[6] Pu, Yunchen, et al. "Variational autoencoder for deep learning of images, labels and captions." Advances in Neural Information Processing Systems. 2016.

The invention claimed is:

1. A method for improving the training of a computer-based object recognizer to recognize an object within an image, the method comprising:
  (a) obtaining a set of real-world images of a target object;
  (b) creating a set of synthetic images of the target object;
  (c) training a translator to produce a plurality of translated images of the target object, said translator comprising a first computer-based machine learning system having a convolutional autoencoder, where said translator training includes providing the translator with a plurality of pairings, where each pairing is obtained by identifying one of the set of real-world images that corresponds with one of the set of synthetic images, and where the convolutional autoencoder learns from the pairings how to produce the plurality of translated images of the target object;

(d) invoking the trained translator to produce the plurality of translated images;

(e) training a generative adversarial network (GAN) to produce a plurality of generated images of the target object, said GAN comprising a second computer-based machine learning system having a discriminative neural network and a generative neural network, where said GAN training includes instantiating the generative neural network with Gaussian noise and instantiating the discriminative neural network with the set of real-world images, where each image in the set of real-world images is labeled according to the target object;

(f) invoking the trained GAN to produce the plurality of generated images;

(g) training an object recognizer to recognize the target object within a newly presented digital image by providing the object recognizer a collection of training images, said collection of training images assembled from (1) the set of real-world images of the target object, (2) the plurality of translated images of the target object, and (3) the plurality of generated images of the target object, said object recognizer embodied in at least a portion of a high-speed graphics processing unit of a digital computer, said object recognizer comprising a machine learning module capable of being trained with the collection of training images to recognize the target object within the newly presented digital image; and (h) using the trained object recognizer to recognize the target object in the new digital image, where the new digital image is obtained from an external image sensor.

2. The method of claim 1, where said translator training includes providing the translator with the generated images.

3. The method of claim 1, wherein the set of synthetic images of the target object are obtained from the generated images.

4. The method of claim 1, where said translator training includes providing the translator with a plurality of second pairings, where each second pairing is obtained by identifying one of the set of real-world images that corresponds with one of the set of generated images, and where the convolutional autoencoder additionally learns from the second pairings how to produce the plurality of translated images of the target object.

5. The method of claim 1, where said GAN training includes instantiating the discriminative neural network with the set of synthetic images.

6. The method of claim 1, where said GAN training includes instantiating the discriminative neural network with the set of translated images.

7. The method of claim 1, where said translator training includes providing the translator with the generated images and where said GAN training includes instantiating the discriminative neural network with the set of translated images.

8. The method of claim 1, where said translator training includes providing the translator with the generated images and where said GAN training includes instantiating the discriminative neural network with the set of synthetic images.

9. The method of claim 1, where the convolutional autoencoder of the translator includes a first loss function that is invoked iteratively during the translator training, where the object recognizer includes a second loss function that is invoked iteratively during the object recognizer training, where the translator training is synchronized with the object recognizer training, and where loss values from the second loss function are incorporated into calculations made by the first loss function.

* * * * *